United States Patent
Myung et al.

(10) Patent No.: US 12,069,649 B2
(45) Date of Patent: Aug. 20, 2024

(54) METHOD FOR TRANSMITTING AND RECEIVING SIGNAL IN UNLICENSED BAND, AND APPARATUS THEREFOR

(71) Applicant: LG Electronics Inc., Seoul (KR)

(72) Inventors: Sechang Myung, Seoul (KR); Suckchel Yang, Seoul (KR); Seonwook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 18/501,591

(22) Filed: Nov. 3, 2023

(65) Prior Publication Data
US 2024/0064738 A1 Feb. 22, 2024

Related U.S. Application Data

(63) Continuation of application No. PCT/KR2022/006316, filed on May 3, 2022.

(30) Foreign Application Priority Data

May 10, 2021 (KR) .................. 10-2021-0060122
Aug. 5, 2021 (KR) .................. 10-2021-0103364

(51) Int. Cl.
H04W 72/1268 (2023.01)
H04W 16/14 (2009.01)
H04W 74/0808 (2024.01)

(52) U.S. Cl.
CPC ....... *H04W 72/1268* (2013.01); *H04W 16/14* (2013.01); *H04W 74/0808* (2013.01)

(58) Field of Classification Search
CPC ............. H04W 72/1268; H04W 16/14; H04W 74/0808
See application file for complete search history.

(56) References Cited

U.S. PATENT DOCUMENTS

2010/0220652 A1* 9/2010 Ishii .................. H04L 5/0087
370/328
2017/0339721 A1* 11/2017 Mukherjee .......... H04W 72/566
(Continued)

FOREIGN PATENT DOCUMENTS

KR 10-2020-0018172 2/2020

OTHER PUBLICATIONS

International Search Report and Written Opinion in Appln. No. PCT/KR2022/006316, mailed on Aug. 17, 2022, 14 pages (with English translation).

(Continued)

*Primary Examiner* — Siren Wei
(74) *Attorney, Agent, or Firm* — Fish & Richardson P.C.

(57) ABSTRACT

The present disclosure discloses a method by a terminal transmits an uplink (UL) signal in a wireless communication system. In particular, the method comprises: determining an energy detection (ED) threshold value on the basis of maximum effective isotropic radiated power (EIRP) from among at least one of pieces of first EIRP for at least one first UL signal; acquiring channel occupancy on the basis of the ED threshold value; and, within the channel occupancy, (i) transmitting the at least one first UL signal on the basis of each of at least one of pieces of first EIRP for each of the at least one first UL signal, and (ii) transmitting a second UL signal on the basis of second EIRP, wherein the second EIRP is less than or equal to the maximum EIRP.

15 Claims, 20 Drawing Sheets

(56) References Cited

U.S. PATENT DOCUMENTS

| | | | |
|---|---|---|---|
| 2018/0352577 A1* | 12/2018 | Zhang | H04W 74/0816 |
| 2020/0413268 A1* | 12/2020 | Yerramalli | H04W 72/046 |
| 2021/0058936 A1 | 2/2021 | Gordaychik | |
| 2021/0105815 A1 | 4/2021 | Salem | |

OTHER PUBLICATIONS

Moderator (Qualcomm Incorporated), "Email discussion summary for channel access mechanism for 52.6GHz-71GHz band, ver03," 3GPP TSG RAN WG1 Meeting #104bis-e, R1-2104040, Apr. 12-20, 2021, 98 pages.

* cited by examiner

Uplink Tx procedure based on dynamic grant

Uplink Tx procedure based on configured grant

Carrier aggregation between L-band and U-band

Standalone U-band(s)

METHOD FOR TRANSMITTING AND RECEIVING SIGNAL IN UNLICENSED BAND, AND APPARATUS THEREFOR

CROSS-REFERENCE TO RELATED APPLICATIONS

This application is a continuation of International Application No. PCT/KR2022/006316, filed on May 3, 2022, which claims the benefit of Korean Application Nos. 10-2021-0103364, filed on Aug. 5, 2021, and 10-2021-0060122, filed on May 10, 2021. The disclosures of the prior applications are incorporated by reference in their entirety.

TECHNICAL FIELD

The present disclosure relates to a method of transmitting and receiving a signal in an unlicensed band and apparatus therefor, and more particularly, to a method of determining one or more Energy Detection (ED) threshold to transmit and receive a signal through one or more Tx beams in an unlicensed band and performing Listen-Before-Talk (LBT) and apparatus therefor.

BACKGROUND

As more and more communication devices demand larger communication traffic along with the current trends, a future-generation 5th generation (5G) system is required to provide an enhanced wireless broadband communication, compared to the legacy LTE system. In the future-generation 5G system, communication scenarios are divided into enhanced mobile broadband (eMBB), ultra-reliability and low-latency communication (URLLC), massive machine-type communication (mMTC), and so on.

Herein, eMBB is a future-generation mobile communication scenario characterized by high spectral efficiency, high user experienced data rate, and high peak data rate, URLLC is a future-generation mobile communication scenario characterized by ultra-high reliability, ultra-low latency, and ultra-high availability (e.g., vehicle to everything (V2X), emergency service, and remote control), and mMTC is a future-generation mobile communication scenario characterized by low cost, low energy, short packet, and massive connectivity (e.g., Internet of things (IoT)).

SUMMARY

An object of the present disclosure is to provide a method of transmitting and receiving a signal in an unlicensed band and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

In one technical aspect of the present disclosure, provided is a method of transmitting an UpLink (UL) signal by a User Equipment (UE) in a wireless communication system, the method including determining an Energy Detection (ED) threshold based on a maximum Effective Isotropic Related Power (EIRP) among at least one first EIRP for at least one first UL signal, acquiring a channel occupancy based on the ED threshold, and transmitting, within the channel occupancy, (i) the at least one first UL signal based on each of the at least one first EIRP for each of the at least one first UL signal and (ii) a second UL signal based on a second EIRP, wherein the second EIRP may be equal to or smaller than the maximum EIRP.

The second UL signal may not be considered in determination of the ED threshold.

Scheduling information for the at least one first UL signal may be received before scheduling information for the second UL signal is received.

The second EIRP may be equal to the maximum EIRP based on that an EIRP for the second UL signal is greater than the maximum EIRP.

The channel occupancy may be acquired based on a success of Listen-Before-Talk (LBT) based on the ED threshold.

The at least one first UL signal and the second UL signal may be transmitted through UL Tx beams different from each other.

The at least one first UL signal and the second UL signal may be transmitted through frequency band of above 52.6 GHz.

In another technical aspect of the present disclosure, provided is a user equipment transmitting an UpLink (UL) signal in a wireless communication system, the user equipment including at least one transceiver, at least one processor, and at least one memory connected operably to the at least one processor and configured to store instructions for enabling the at least one processor to perform an operation when executed, wherein the operation may include determining an Energy Detection (ED) threshold based on a maximum Effective Isotropic Related Power (EIRP) among at least one first EIRP for at least one first UL signal, acquiring a channel occupancy based on the ED threshold, and transmitting, within the channel occupancy, (i) the at least one first UL signal based on each of the at least one first EIRP for each of the at least one first UL signal and (ii) a second UL signal based on a second EIRP and wherein the second EIRP may be equal to or smaller than the maximum EIRP.

The second UL signal may not be considered in determination of the ED threshold.

Scheduling information for the at least one first UL signal may be received before scheduling information for the second UL signal is received.

The second EIRP may be equal to the maximum EIRP based on that an EIRP for the second UL signal is greater than the maximum EIRP.

The channel occupancy may be acquired based on a success of Listen-Before-Talk (LBT) based on the ED threshold.

The at least one first UL signal and the second UL signal may be transmitted through UL Tx beams different from each other.

The at least one first UL signal and the second UL signal may be transmitted through frequency band of above 52.6 GHz.

In further technical aspect of the present disclosure, provided is an apparatus for transmitting an UpLink (UL) signal in a wireless communication system, the apparatus including at least one transceiver, at least one processor, and at least one memory connected operably to the at least one processor and configured to store instructions for enabling the at least one processor to perform an operation when executed, wherein the operation may include determining an Energy Detection (ED) threshold based on a maximum Effective Isotropic Related Power (EIRP) among at least one first EIRP for at least one first UL signal, acquiring a channel occupancy based on the ED threshold, and transmitting, within the channel occupancy, (i) the at least one first UL signal based on each of the at least one first EIRP for each of the at least one first UL signal and (ii) a second UL signal based on a second EIRP and wherein the second EIRP may be equal to or smaller than the maximum EIRP.

In another further technical aspect of the present disclosure, provided is a computer-readable storage medium including at least one computer program configured to enable at least one processor to perform an operation, wherein the operation may include determining an Energy Detection (ED) threshold based on a maximum Effective Isotropic Related Power (EIRP) among at least one first EIRP for at least one first UL signal, acquiring a channel occupancy based on the ED threshold, and transmitting, within the channel occupancy, (i) the at least one first UL signal based on each of the at least one first EIRP for each of the at least one first UL signal and (ii) a second UL signal based on a second EIRP and wherein the second EIRP may be equal to or smaller than the maximum EIRP.

According to the present disclosure, in order to overcome a relatively large path-loss in a high frequency band of 52.6 GHz or higher, an appropriate ED threshold may be set for Directional LBT (D-LBT) in which a base station and/or user equipment performs Listen-Before-Talk (LBT) in a specific beam direction through technologies such as analog beamforming using multiple antennas.

In addition, it is possible to set an appropriate D-LBT method and appropriate ED thresholds for DL/UL beams that are transmitted in a manner of multiplexing or DL/UL switching beams in different directions within COT acquired through D-LBT success.

In addition, when beams in different directions are multiplexed within the acquired COT, the power of a signal may be effectively controlled so as not to cause interference with RAT other than NR.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DETAILED DESCRIPTION

Figure 1:
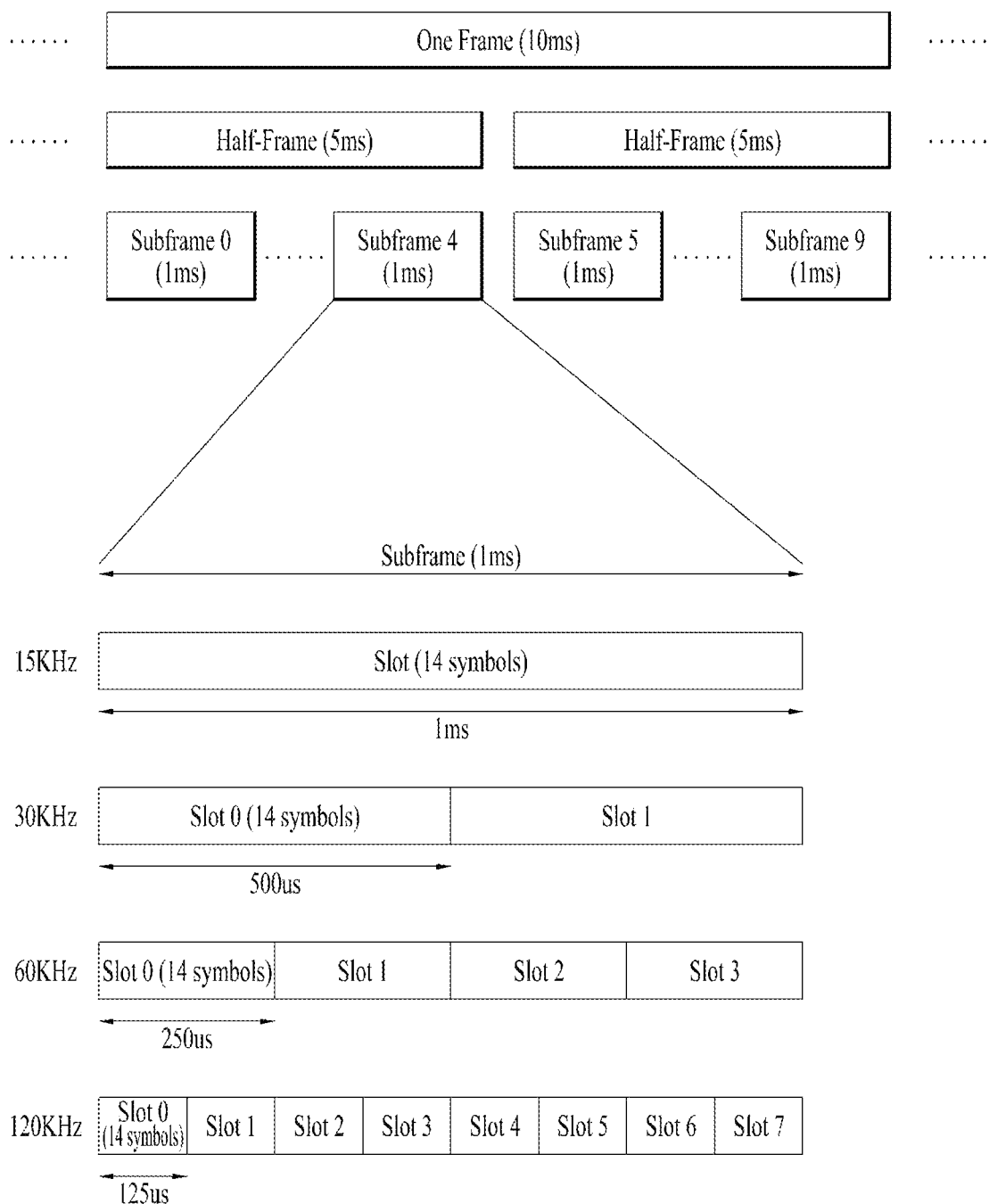
FIG. 1 illustrates a radio frame structure.
Figure 2:
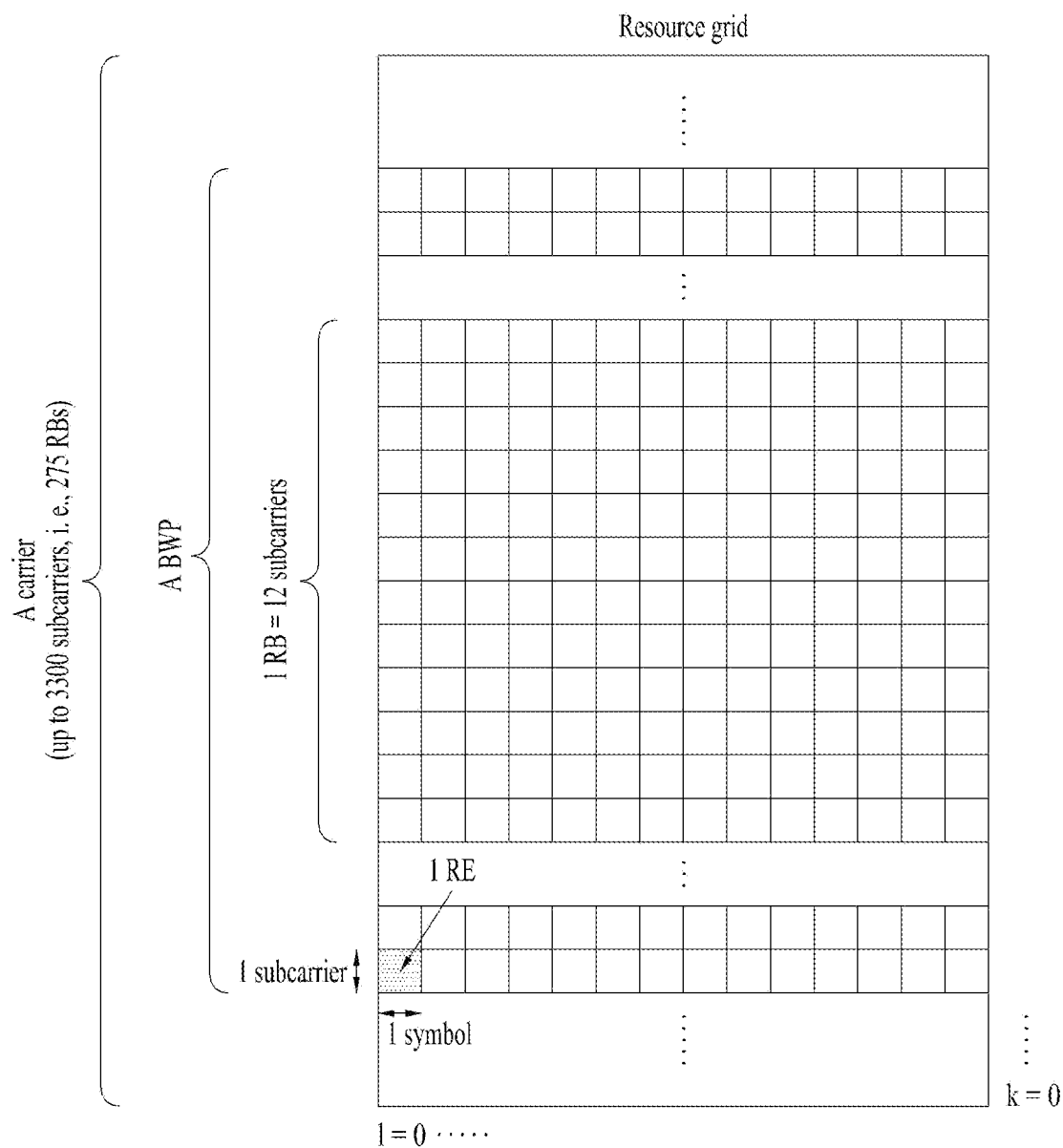
FIG. 2 illustrates a resource grid of a slot.

The following technology may be used in various wireless access systems such as code division multiple access (CDMA), frequency division multiple access (FDMA), time division multiple access (TDMA), orthogonal frequency division multiple access (OFDMA), single carrier frequency division multiple access (SC-FDMA), and so on. CDMA may be implemented as a radio technology such as universal terrestrial radio access (UTRA) or CDMA2000. TDMA may be implemented as a radio technology such as global system for mobile communications (GSM)/general packet radio service (GPRS)/enhanced data rates for GSM evolution (EDGE). OFDMA may be implemented as a radio technology such as institute of electrical and electronics engineers (IEEE) 802.11 (wireless fidelity (Wi-Fi)), IEEE 802.16 (worldwide interoperability for microwave access (WiMAX)), IEEE 802.20, evolved UTRA (E-UTRA), and so on. UTRA is a part of universal mobile telecommunications system (UMTS). 3rd generation partnership project (3GPP) long term evolution (LTE) is a part of evolved UMTS (E-UMTS) using E-UTRA, and LTE-advanced (LTE-A) is an evolution of 3GPP LTE. 3GPP new radio or new radio access technology (NR) is an evolved version of 3GPP LTE/LTE-A.

While the following description is given in the context of a 3GPP communication system (e.g., NR) for clarity, the technical spirit of the present disclosure is not limited to the 3GPP communication system. For the background art, terms, and abbreviations used in the present disclosure, refer to the technical specifications published before the present disclosure (e.g., 38.211, 38.212, 38.213, 38.214, 38.300, 38.331, and so on).

5G communication involving a new radio access technology (NR) system will be described below.

Three key requirement areas of 5G are (1) enhanced mobile broadband (eMBB), (2) massive machine type communication (mMTC), and (3) ultra-reliable and low latency communications (URLLC).

Some use cases may require multiple dimensions for optimization, while others may focus only on one key performance indicator (KPI). 5G supports such diverse use cases in a flexible and reliable way.

eMBB goes far beyond basic mobile Internet access and covers rich interactive work, media and entertainment applications in the cloud or augmented reality (AR). Data is one of the key drivers for 5G and in the 5G era, we may for the first time see no dedicated voice service. In 5G, voice is expected to be handled as an application program, simply using data connectivity provided by a communication system. The main drivers for an increased traffic volume are the increase in the size of content and the number of applications requiring high data rates. Streaming services (audio and video), interactive video, and mobile Internet connectivity will continue to be used more broadly as more devices connect to the Internet. Many of these applications require always-on connectivity to push real time information and notifications to users. Cloud storage and applications are rapidly increasing for mobile communication platforms. This is applicable for both work and entertainment. Cloud storage is one particular use case driving the growth of uplink data rates. 5G will also be used for remote work in the cloud which, when done with tactile interfaces, requires much lower end-to-end latencies in order to maintain a good user experience. Entertainment, for example, cloud gaming and video streaming, is another key driver for the increasing need for mobile broadband capacity. Entertainment will be very essential on smart phones and tablets everywhere, including high mobility environments such as trains, cars and airplanes. Another use case is AR for entertainment and information search, which requires very low latencies and significant instant data volumes.

One of the most expected 5G use cases is the functionality of actively connecting embedded sensors in every field, that is, mMTC. It is expected that there will be 20.4 billion potential Internet of things (IoT) devices by 2020. In industrial IoT, 5G is one of areas that play key roles in enabling smart city, asset tracking, smart utility, agriculture, and security infrastructure.

URLLC includes services which will transform industries with ultra-reliable/available, low latency links such as remote control of critical infrastructure and self-driving vehicles. The level of reliability and latency are vital to smart-grid control, industrial automation, robotics, drone control and coordination, and so on.

Now, multiple use cases in a 5G communication system including the NR system will be described in detail.

5G may complement fiber-to-the home (FTTH) and cable-based broadband (or data-over-cable service interface specifications (DOCSIS)) as a means of providing streams at data rates of hundreds of megabits per second to giga bits per second. Such a high speed is required for TV broadcasts at or above a resolution of 4K (6K, 8K, and higher) as well as virtual reality (VR) and AR. VR and AR applications mostly include immersive sport games. A special network configuration may be required for a specific application program. For VR games, for example, game companies may have to integrate a core server with an edge network server of a network operator in order to minimize latency.

The automotive sector is expected to be a very important new driver for 5G, with many use cases for mobile communications for vehicles. For example, entertainment for passengers requires simultaneous high capacity and high mobility mobile broadband, because future users will expect to continue their good quality connection independent of their location and speed. Other use cases for the automotive sector are AR dashboards. These display overlay information on top of what a driver is seeing through the front window, identifying objects in the dark and telling the driver about the distances and movements of the objects. In the future, wireless modules will enable communication between vehicles themselves, information exchange between vehicles and supporting infrastructure and between vehicles and other connected devices (e.g., those carried by pedestrians). Safety systems may guide drivers on alternative courses of action to allow them to drive more safely and lower the risks of accidents. The next stage will be remote-controlled or self-driving vehicles. These require very reliable, very fast communication between different self-driving vehicles and between vehicles and infrastructure. In the future, self-driving vehicles will execute all driving activities, while drivers are focusing on traffic abnormality elusive to the vehicles themselves. The technical requirements for self-driving vehicles call for ultra-low latencies and ultra-high reliability, increasing traffic safety to levels humans cannot achieve.

Smart cities and smart homes, often referred to as smart society, will be embedded with dense wireless sensor networks. Distributed networks of intelligent sensors will identify conditions for cost- and energy-efficient maintenance of the city or home. A similar setup may be done for each home, where temperature sensors, window and heating controllers, burglar alarms, and home appliances are all connected wirelessly. Many of these sensors are typically characterized by low data rate, low power, and low cost, but for example, real time high definition (HD) video may be required in some types of devices for surveillance.

The consumption and distribution of energy, including heat or gas, is becoming highly decentralized, creating the need for automated control of a very distributed sensor network. A smart grid interconnects such sensors, using digital information and communications technology to gather and act on information. This information may include information about the behaviors of suppliers and consumers, allowing the smart grid to improve the efficiency, reliability, economics and sustainability of the production and distribution of fuels such as electricity in an automated fashion. A smart grid may be seen as another sensor network with low delays.

The health sector has many applications that may benefit from mobile communications. Communications systems enable telemedicine, which provides clinical health care at a distance. It helps eliminate distance barriers and may improve access to medical services that would often not be consistently available in distant rural communities. It is also used to save lives in critical care and emergency situations. Wireless sensor networks based on mobile communication may provide remote monitoring and sensors for parameters such as heart rate and blood pressure.

Wireless and mobile communications are becoming increasingly important for industrial applications. Wires are expensive to install and maintain, and the possibility of replacing cables with reconfigurable wireless links is a tempting opportunity for many industries. However, achieving this requires that the wireless connection works with a similar delay, reliability and capacity as cables and that its management is simplified. Low delays and very low error probabilities are new requirements that need to be addressed with 5G.

Finally, logistics and freight tracking are important use cases for mobile communications that enable the tracking of inventory and packages wherever they are by using location-based information systems. The logistics and freight tracking use cases typically require lower data rates but need wide coverage and reliable location information.

FIG. 1 illustrates a radio frame structure.

In NR, UL and DL transmissions are configured in frames. Each radio frame has a length of 10 ms and is divided into two 5-ms half-frames. Each half-frame is divided into five 1-ms subframes. A subframe is divided into one or more slots, and the number of slots in a subframe depends on a subcarrier spacing (SCS). Each slot includes 12 or 14 OFDM(A) symbols according to a cyclic prefix (CP). When a normal CP is used, each slot includes 14 OFDM symbols. When an extended CP is used, each slot includes 12 OFDM symbols. A symbol may include an OFDM symbol (or a CP-OFDM symbol) and an SC-FDMA symbol (or a discrete Fourier transform-spread-OFDM (DFT-s-OFDM) symbol).

Table 1 exemplarily illustrates that the number of symbols per slot, the number of slots per frame, and the number of slots per subframe vary according to SCSs in a normal CP case.

TABLE 1

| SCS (15*2^u) | Nslotsymb | Nframe,uslot | Nsubframe,uslot |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

*$N^{slot}_{symb}$: number of symbols in a slot
*$N^{frame,u}_{slot}$: number of slots in a frame
*$N^{subframe,u}_{slot}$: number of slots in a subframe Table 2 illustrates that the number of symbols per slot, the number of slots per frame, and the number of slots per subframe vary according to SCSs in an extended CP case.

TABLE 2

| SCS (15*2^u) | Nslotsymb | Nframe,uslot | Nsubframe,uslot |
|---|---|---|---|
| 60 KHz (u = 2) | 12 | 40 | 4 |

The frame structure is merely an example, and the number of subframes, the number of slots, and the number of symbols in a frame may be changed in various manners. In the NR system, different OFDM(A) numerologies (e.g., SCSs, CP lengths, and so on) may be configured for a plurality of cells aggregated for one UE. Accordingly, the (absolute time) duration of a time resource (e.g., a subframe, a slot, or a transmission time interval (TTI)) (for convenience, referred to as a time unit (TU)) composed of the same number of symbols may be configured differently between the aggregated cells.

In NR, various numerologies (or SCSs) may be supported to support various 5th generation (5G) services. For example, with an SCS of 15 kHz, a wide area in traditional cellular bands may be supported, while with an SCS of 30 kHz or 60 kHz, a dense urban area, a lower latency, and a wide carrier bandwidth may be supported. With an SCS of 60 kHz or higher, a bandwidth larger than 24.25 kHz may be supported to overcome phase noise.

An NR frequency band may be defined by two types of frequency ranges, FR1 and FR2. FR1 and FR2 may be configured as described in Table 3 below. FR2 may be millimeter wave (mmW).

TABLE 3

| Frequency Range designation | Corresponding frequency range | Subcarrier Spacing |
|---|---|---|
| FR1 | 450 MHz-7125 MHz | 15, 30, 60 kHz |
| FR2 | 24250 MHz-52600 MHz | 60, 120, 240 kHz |

Figure 3A:
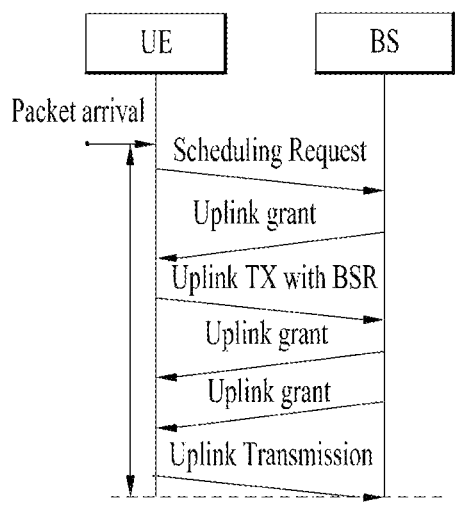
FIGS. 3A and 3B illustrate exemplary uplink (UL) transmission operations of a user equipment (UE).
Figure 3B:
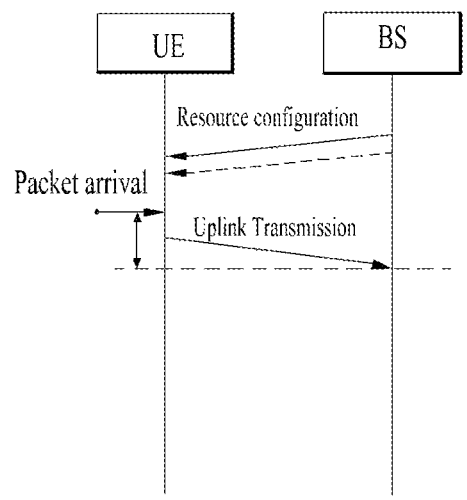

FIGS. 3A and 3B illustrate a resource grid during the duration of one slot. A slot includes a plurality of symbols in the time domain. For example, one slot includes 14 symbols in a normal CP case and 12 symbols in an extended CP case. A carrier includes a plurality of subcarriers in the frequency domain. A resource block (RB) may be defined by a plurality of (e.g., 12) consecutive subcarriers in the frequency domain. A bandwidth part (BWP) may be defined by a plurality of consecutive (physical) RBs ((P)RBs) in the frequency domain and correspond to one numerology (e.g., SCS, CP length, and so on). A carrier may include up to N (e.g., 5) BWPs. Data communication may be conducted in an active BWP, and only one BWP may be activated for one UE. Each element in a resource grid may be referred to as a resource element (RE), to which one complex symbol may be mapped.

FIGS. 3A and 3B illustrate exemplary UL transmission operations of a UE. The UE may transmit an intended packet based on a DG (FIG. 3A) or based on a CG (FIG. 3B).

Resources for CGs may be shared between a plurality of UEs. A UL signal transmission based on a CG from each UE may be identified by time/frequency resources and an RS parameter (e.g., a different cyclic shift or the like). Therefore, when a UE fails in transmitting a UL signal due to signal collision, the BS may identify the UE and explicitly transmit a retransmission grant for a corresponding TB to the UE.

K repeated transmissions including an initial transmission are supported for the same TB by a CG. The same HARQ process ID is determined for K times repeated UL signals based on resources for the initial transmission. The redundancy versions (RVs) of a K times repeated TB have one of the patterns {0, 2, 3, 1}, {0, 3, 0, 3}, and {0, 0, 0, 0}.

The UE performs repeated transmissions until one of the following conditions is satisfied:
 A UL grant for the same TB is successfully received;
 The repetition number of the TB reaches K; and
 the ending time of a period P is reached.

Uplink Power Control

1. PUSCH (Physical Uplink Shared Channel) Power Control

If a UE transmits a PUSCH at an active UL BWP b of a carrier f of a serving cell c using a PUSCH power control adjustment state with an index l and a parameter set configuration with an index j, the UE may determine a PUSCH transmission power $P_{PUSCH,b,f,c}(i,j,q_d,l)$ at a PUSCH transmission occasion i using the following [Equation 1].

[Equation 1]

$$P_{PUSCH,b,f,c}(i, j, q_d, l) = \min \begin{cases} P_{CMAX,f,c}(i), \\ P_{O\_PUSCH,b,f,c}(j) + 10\log_{10}(2^\mu \cdot M^{PUSCH}_{RB,b,f,c}(i)) + \\ \alpha_{b,f,c}(j) \cdot PL_{b,f,c}(q_d) + \Delta_{TF,b,f,c}(i) + f_{b,f,c}(i, l) \end{cases} [dBm]$$

Here, $P_{CMAX,f,c}(i)$ is a maximum output power for the carrier f of the serving cell c in the PUSCH transmission occasion i configured for the UE.

Also, $P_{O\_PUSCH,b,f,c}(j)$ is a parameter consisting of the sum of a component $P_{O\_NOMINAL\_PUSCH,f,c}(j)$ and a component $P_{O\_UE\_PUSCH,f,c}(j)$ when j∈ {0, 1, . . . , J−1}.

In this case, the values of $P_{O\_NOMINAL\_PUSCH,f,c}(j)$ and $P_{O\_UE\_PUSCH,f,c}(j)$ may differ depending on the use of PUSCH (e.g., Type-1 Random Access, Type-2 Random Access, Configured Grant, Dynamic Grant).

$\alpha_{b,f,c}(j)$ is an offset value to compensate for a path loss, and it may also vary depending on the use of PUSCH (e.g., Type-1 Random Access, Type-2 Random Access, Configured Grant, Dynamic Grant).

$M_{RB,b,f,c}^{PUSCH}(i)$ is a bandwidth for PUSCH resource allocation expressed by the number and Subcarrier Spacing (SCS) of Resource Blocks (RBs) for the PUSCH transmission occasion i in the active UL BWP b of the carrier f of the serving cell c.

$PL_{b,f,c}(q_d)$ is a downlink pathloss estimate calculated in dB units by the UE using a reference signal index q for the active DL BWP of the carrier f of the serving cell c.

$\Delta_{TF,b,f,c}(i)$ is a value determined based on an higher layer parameter deltaMCS for the active UL BWP b of the carrier f of the serving cell c.

$f_{b,f,c}(i,l)$ is the PUSCH power control adjustment state for the PUSCH transmission occasion i and the active UL BWP b of the carrier f and serving cell c.

2. PUCCH (Physical Uplink Control Channel) Power Control

If a UE transmits a PUCCH at an active UL BWP b of a carrier f of a primacy cell c using a PUCCH power control adjustment state with an index l, the UE may determine PUCCH transmission power $P_{PUCCH,b,f,c}(i,q_u,q_d,l)$ on a PUCCH transmission occasion i using the following [Equation 2].

[Equation 2]

$P_{PUSCH,b,f,c}(i, q_u, q_d, l) =$ $$\min \begin{Bmatrix} P_{CMAX,f,c}(i), \\ P_{O\_PUSCH,b,f,c}(q_u) + 10\log_{10}(2^\mu \cdot M_{RB,b,f,c}^{PUSCH}(i)) + \\ PL_{b,f,c}(q_d) + \Delta_{F\_PUCCH}(F) + \Delta_{TF,b,f,c}(i) + \\ g_{b,f,c}(i,l) \end{Bmatrix} [dBm]$$

Here, $P_{CMAX,f,c}(i)$ is the maximum output power for the carrier f of the primary cell c on the PUCCH transmission occasion i configured for the UE.

In addition, $P_{O\_PUCCH,b,f,c}(q_u)$ is the parameter consisting of the sum of a component $P_{O\_NOMINAL\_PUCCH}$ and a component $P_{O\_UE\_PUCCH}(q_u)$.

In this case, the values of $P_{O\_PUCCH,b,f,c}(q_u)$ and $P_{O\_UE\_PUCCH}(q_u)$ may vary depending on the value of higher layer signaling and/or a presence of non-presence of higher layer signaling.

$M_{RB,b,f,c}^{PUCCH}(i)$ is a bandwidth for PUSCH resource allocation expressed by the number of Resource Blocks (RBs) and subcarrier spacing for the PUSCH transmission occasion i in the active UL BWP b of the carrier f of the primary cell c.

$PL_{b,f,c}(q_d)$ is a downlink path loss estimate calculated in dB units by the UE using a reference signal index q for the active DL BWP of the carrier f of the primary cell c.

$\Delta_{TF,b,f,c}(i)$ is a PUCCH transmission power adjustment component for the active DL BWP of the carrier f of the primary cell c, and may vary depending on a PUCCH format.

$g_{b,f,c}(i,l)$ is a PUCCH transmission power adjustment state for the active DL BWP of the carrier f of the primary cell c, and may vary depending on Transmission Power Control (TPC).

3. Sounding Reference Signal (SRS) Power Control

The UE may distribute the same power to antenna ports configured for SRS transmission. If the UE transmits an SRS on active UL BWP b of carrier f of serving cell c using SRS power control adjustment state index l, SRS transmission power in SRS transmission occasion i may be determined as shown in Equation 3.

[Equation 3]

$P_{SRS,b,f,c}(i, q_s, l) =$ $$\min \begin{Bmatrix} P_{CMAX,f,c}(i), \\ P_{O\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{Bmatrix} [dBm]$$

In Equation 3, $P_{CMAX,f,c}(i)$ denotes the maximum power output by the UE for carrier f of serving cell c in SRS transmission occasion i, and $P_{O\_SRS,b,f,c}(q_s)$ may be obtained based on SRS resource set $q_s$ and $p_0$ for active UL BWP b.

In addition, $M_{SRS,b,f,c}(i)$ is an SRS bandwidth expressed in the number of RBs for SRS transmission occasion i on active UL BWP b, and $\alpha_{SRS,b,f,c}(q_s)$ may be obtained from alpha for UL BWP b of carrier f of serving cell c and SRS resource set $q_s$. $PL_{b,f,c}(q_d)$ is a DL pathloss estimate in dB and may be calculated based on RS index $q_d$ for an active DL BWP of the serving cell and SRS resource set $q_s$. The RS index $q_d$ is provided by the higher layer parameter pathlossReferenceRS associated with SRS resource set $q_s$. The UE may obtain an SS/PBCH block index or a CSI-RS resource index from pathlossReferenceRS. If the UE does not receive pathlossReferenceRSs, the UE may obtain $PL_{b,f,c}(q_d)$ by using as a RS resource the SS/PBCH block index obtained from a master information block (MIB).

Additionally, $h_{b,f,c}(i)$ may be defined by $$h_{b,f,c}(i) = h_{b,f,c}(i - i_0) + \sum_{m=0}^{c(S_i)-1} \delta_{SRS,b,f,c}(m),$$

where the value of $\delta_{SRS,b,f,c}$ may be determined according to a predetermined table. In addition, $\delta_{SRS,b,f,c}(m)$ may be jointly coded with other transmit power control (TPC) commands included in DCI format 2_3 and $$\sum_{m=0}^{c(S_i)-1} \delta_{SRS,b,f,c}(m)$$

may be determined based on the sum of TPC command values included in a specific TPC command set.

Similarly to licensed-assisted access (LAA) in the legacy 3GPP LTE system, use of an unlicensed band for cellular communication is also under consideration in a 3GPP NR system. Unlike LAA, a stand-along (SA) operation is aimed in an NR cell of an unlicensed band (hereinafter, referred to as NR unlicensed cell (UCell)). For example, PUCCH, PUSCH, and PRACH transmissions may be supported in the NR UCell.

On LAA UL, with the introduction of an asynchronous HARQ procedure, there is no additional channel such as a physical HARQ indicator channel (PHICH) for indicating HARQ-ACK information for a PUSCH to the UE. Therefore, accurate HARQ-ACK information may not be used to adjust a contention window (CW) size in a UL LBT procedure. In the UL LBT procedure, when a UL grant is received in the n-th subframe, the first subframe of the most recent UL transmission burst prior to the (n−3)-th subframe has been configured as a reference subframe, and the CW size has been adjusted based on a new data indicator (NDI) for a HARQ process ID corresponding to the reference subframe. That is, when the BS toggles NDIs per one or more transport blocks (TBs) or instructs that one or more TBs be retransmitted, a method has been introduced of increasing the CW size to the next largest CW size of a currently applied CW size in a set for pre-agreed CW sizes under the assumption that transmission of a PUSCH has failed in the reference subframe due to collision with other signals or initializing the CW size to a minimum value (e.g., CWmin) under the assumption that the PUSCH in the reference subframe has been successfully transmitted without any collision with other signals.

In an NR system to which various embodiments of the present disclosure are applicable, up to 400 MHz per component carrier (CC) may be allocated/supported. When a UE operating in such a wideband CC always operates with a radio frequency (RF) module turned on for the entire CC, battery consumption of the UE may increase.

Alternatively, considering various use cases (e.g., eMBB, URLLC, mMTC, and so on) operating within a single wideband CC, a different numerology (e.g., SCS) may be supported for each frequency band within the CC.

Alternatively, each UE may have a different maximum bandwidth capability.

In this regard, the BS may indicate to the UE to operate only in a partial bandwidth instead of the total bandwidth of the wideband CC. The partial bandwidth may be defined as a bandwidth part (BWP).

A BWP may be a subset of contiguous RBs on the frequency axis. One BWP may correspond to one numerology (e.g., SCS, CP length, slot/mini-slot duration, and so on).

Figure 4A:
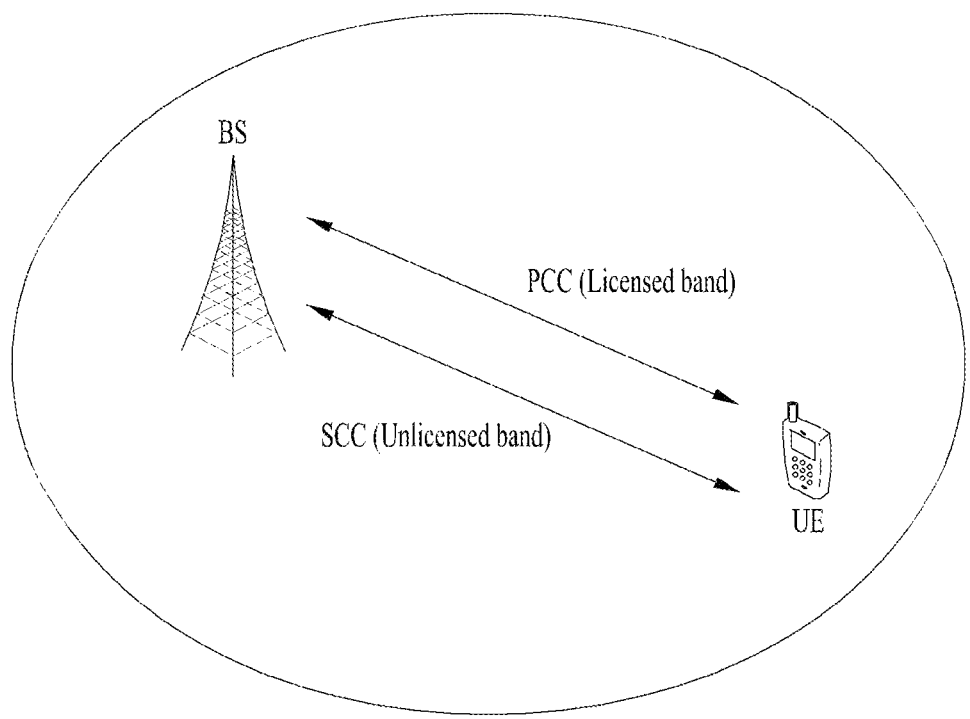
FIGS. 4A and 4B illustrate a wireless communication system supporting an unlicensed band.
Figure 4B:
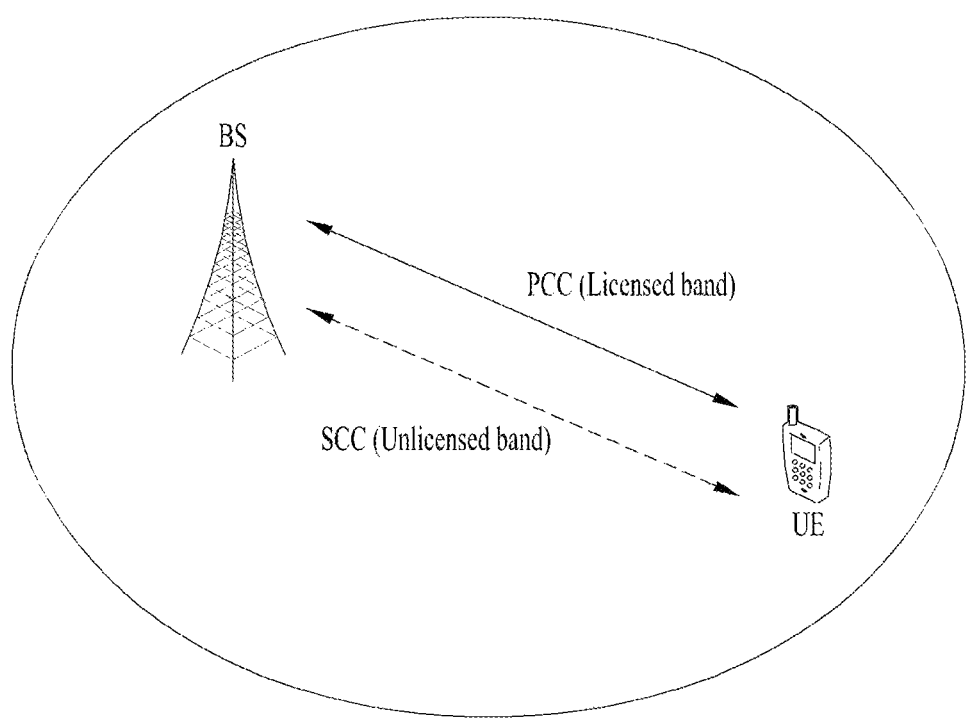

FIGS. 4A and 4B illustrate an exemplary wireless communication system supporting an unlicensed band applicable to the present disclosure.

In the following description, a cell operating in a licensed band (L-band) is defined as an L-cell, and a carrier of the L-cell is defined as a (DL/UL) LCC. A cell operating in an unlicensed band (U-band) is defined as a U-cell, and a carrier of the U-cell is defined as a (DL/UL) UCC. The carrier/carrier-frequency of a cell may refer to the operating frequency (e.g., center frequency) of the cell. A cell/carrier (e.g., CC) is commonly called a cell.

When a BS and a UE transmit and receive signals on carrier-aggregated LCC and UCC as illustrated in FIG. 4A, the LCC and the UCC may be configured as a primary CC (PCC) and a secondary CC (SCC), respectively. The BS and the UE may transmit and receive signals on one UCC or on a plurality of carrier-aggregated UCCs as illustrated in FIG. 4B. In other words, the BS and UE may transmit and receive signals only on UCC(s) without using any LCC. For an SA operation, PRACH, PUCCH, PUSCH, and SRS transmissions may be supported on a UCell.

Signal transmission and reception operations in an unlicensed band as described in the present disclosure may be applied to the afore-mentioned deployment scenarios (unless specified otherwise).

Unless otherwise noted, the definitions below are applicable to the following terminologies used in the present disclosure.

Channel: a carrier or a part of a carrier composed of a contiguous set of RBs in which a channel access procedure (CAP) is performed in a shared spectrum.

Channel access procedure (CAP): a procedure of assessing channel availability based on sensing before signal transmission in order to determine whether other communication node(s) are using a channel. A basic sensing unit is a sensing slot with a duration of Tsl=9 us. The BS or the UE senses the slot during a sensing slot duration. When power detected for at least 4 us within the sensing slot duration is less than an energy detection threshold Xthresh, the sensing slot duration Tsl is be considered to be idle. Otherwise, the sensing slot duration Tsl is considered to be busy. CAP may also be called listen before talk (LBT).

Channel occupancy: transmission(s) on channel(s) from the BS/UE after a CAP.

Channel occupancy time (COT): a total time during which the BS/UE and any BS/UE(s) sharing channel occupancy performs transmission(s) on a channel after a CAP. Regarding COT determination, if a transmission gap is less than or equal to 25 us, the gap duration may be counted in a COT.

The COT may be shared for transmission between the BS and corresponding UE(s).

Specifically, sharing a UE-initiated COT with the BS may mean an operation in which the UE assigns a part of occupied channels through random backoff counter-based LBT (e.g., Category 3 (Cat-3) LBT or Category 4 (Cat-4) LBT) to the BS and the BS performs DL transmission using a remaining COT of the UE, when it is confirmed that a channel is idle by success of LBT after performing LBT without random backoff counter (e.g., Category 1 (Cat-1) LBT or Category 2 (Cat-2) LBT) using a timing gap occurring before DL transmission start from a UL transmission end timing of the UE.

Meanwhile, sharing a gNB-initiated COT with the UE may mean an operation in which the BS assigns a part of occupied channels through random backoff counter-based LBT (e.g., Cat-3 LBT or Cat-4 LBT) to the UE and the UE performs UL transmission using a remaining COT of the BS, when it is confirmed that a channel is idle by success of LBT after performing LBT without random backoff counter (e.g., Cat-1 LBT or Cat-2 LBT) using a timing gap occurring before UL transmission start from a DL transmission end timing of the BS.

DL transmission burst: a set of transmissions without any gap greater than 16 us from the BS. Transmissions from the BS, which are separated by a gap exceeding 16 us are considered as separate DL transmission bursts. The BS may perform transmission(s) after a gap without sensing channel availability within a DL transmission burst.

UL transmission burst: a set of transmissions without any gap greater than 16 us from the UE. Transmissions from the UE, which are separated by a gap exceeding 16 us are considered as separate UL transmission bursts. The UE may perform transmission(s) after a gap without sensing channel availability within a DL transmission burst.

Discovery burst: a DL transmission burst including a set of signal(s) and/or channel(s) confined within a window and associated with a duty cycle. The discovery burst may include transmission(s) initiated by the BS, which includes a PSS, an SSS, and a cell-specific RS (CRS) and further includes a non-zero power CSI-RS. In the NR system, the discover burst includes may include transmission(s) initiated by the BS, which includes at least an SS/PBCH block and further includes a CORESET for a PDCCH scheduling a PDSCH carrying SIB1, the PDSCH carrying SIB1, and/or a non-zero power CSI-RS.

Figure 5:
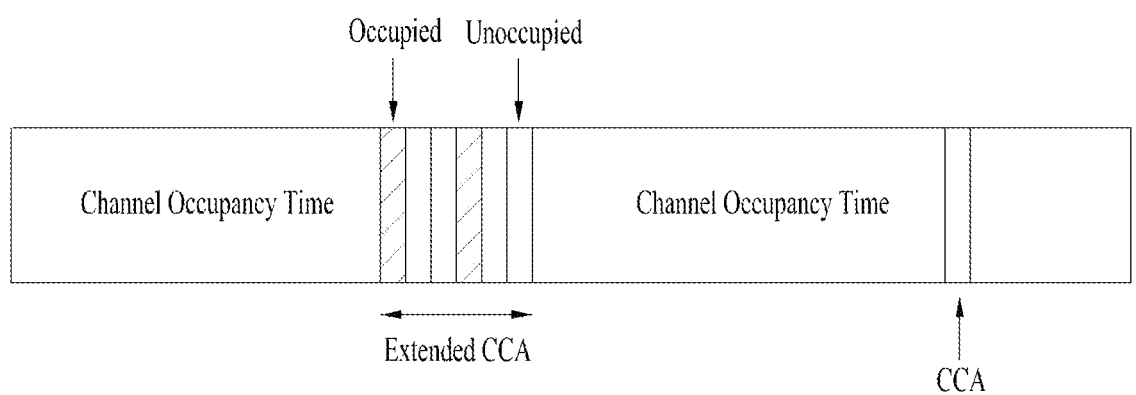
FIG. 5 illustrates an exemplary method of occupying resources in an unlicensed band.

FIG. 5 illustrates an exemplary method of occupying resources in an unlicensed band.

Referring to FIG. 5, a communication node (e.g., a BS or a UE) operating in an unlicensed band should determine whether other communication node(s) is using a channel, before signal transmission. For this purpose, the communication node may perform a CAP to access channel(s) on which transmission(s) is to be performed in the unlicensed band. The CAP may be performed based on sensing. For example, the communication node may determine whether other communication node(s) is transmitting a signal on the channel(s) by carrier sensing (CS) before signal transmission. Determining that other communication node(s) is not transmitting a signal is defined as confirmation of clear channel assessment (CCA). In the presence of a CCA threshold (e.g., Xthresh) which has been predefined or configured by higher-layer (e.g., RRC) signaling, the communication node may determine that the channel is busy, when detecting energy higher than the CCA threshold in the channel. Otherwise, the communication node may determine that the channel is idle. When determining that the channel is idle, the communication node may start to transmit a signal in the unlicensed band. CAP may be replaced with LBT.

Table 4 describes an exemplary CAP supported in NR-U.

TABLE 4

| | Type | Explanation |
|---|---|---|
| DL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |
| UL | Type 1 CAP | CAP with random back-off time duration spanned by the sensing slots that are sensed to be idle before a downlink transmission(s) is random |
| | Type 2 CAP Type 2A, 2B, 2C | CAP without random back-off time duration spanned by sensing slots that are sensed to be idle before a downlink transmission(s) is deterministic |

In a wireless communication system supporting an unlicensed band, one cell (or carrier (e.g., CC)) or BWP configured for a UE may be a wideband having a larger bandwidth (BW) than in legacy LTE. However, a BW requiring CCA based on an independent LBT operation may be limited according to regulations. Let a subband (SB) in which LBT is individually performed be defined as an LBT-SB. Then, a plurality of LBT-SBs may be included in one wideband cell/BWP. A set of RBs included in an LBT-SB may be configured by higher-layer (e.g., RRC) signaling. Accordingly, one or more LBT-SBs may be included in one cell/BWP based on (i) the BW of the cell/BWP and (ii) RB set allocation information. A plurality of LBT-SBs may be included in the BWP of a cell (or carrier). An LBT-SB may be, for example, a 20-MHz band. The LBT-SB may include a plurality of contiguous (P)RBs in the frequency domain, and thus may be referred to as a (P)RB set.

A UE performs a Type 1 or Type 2 CAP for a UL signal transmission in an unlicensed band. In general, the UE may perform a CAP (e.g., Type 1 or Type 2) configured by a BS, for a UL signal transmission. For example, CAP type indication information may be included in a UL grant (e.g., DCI format 0_0 or DCI format 0_1) that schedules a PUSCH transmission.

In the Type 1 UL CAP, the length of a time period spanned by sensing slots sensed as idle before transmission(s) is random. The Type 1 UL CAP may be applied to the following transmissions.

PUSCH/SRS transmission(s) scheduled and/or configured by BS

PUCCH transmission(s) scheduled and/or configured by BS

Transmission(s) related to random access procedure (RAP)

Figure 6:
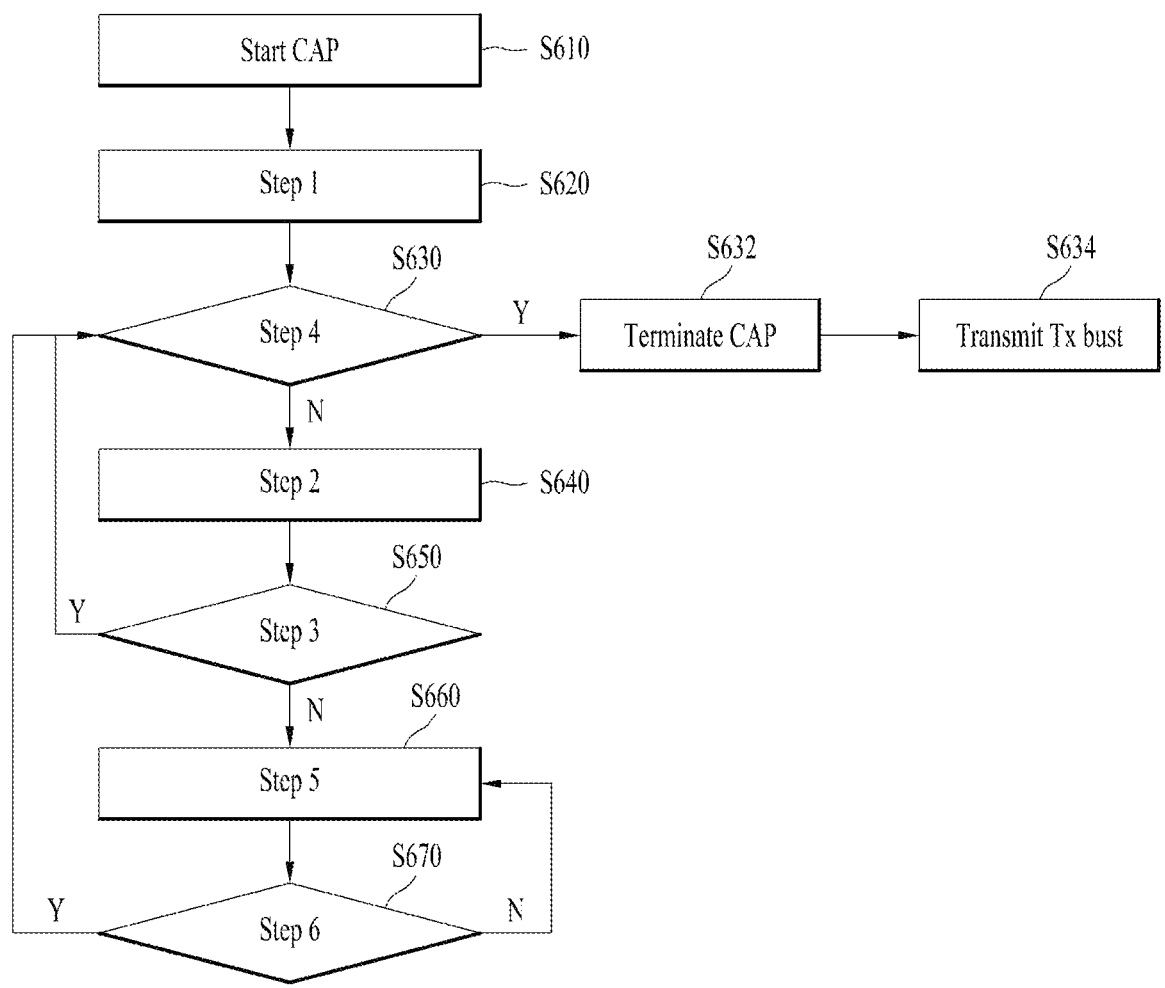
FIG. 6 illustrates an exemplary channel access procedure of a UE for UL signal transmission and/or DL signal transmission in an unlicensed band applicable to the present disclosure.

FIG. 6 illustrates Type 1 CAP among channel access procedures of a UE for UL/DL signal transmission in a U-band applicable to the present disclosure.

First, UL signal transmission in the U-band will be described with reference to FIG. 6.

The UE may sense whether a channel is idle for a sensing slot duration in a defer duration Td. After a counter N is decremented to 0, the UE may perform a transmission (S434). The counter N is adjusted by sensing the channel for additional slot duration(s) according to the following procedure.

Step 1) Set N=Ninit where Ninit is a random number uniformly distributed between 0 and CWp, and go to step 4 (S420).

Step 2) If N>0 and the UE chooses to decrement the counter, set N=N−1 (S440).

Step 3) Sense the channel for an additional slot duration, and if the additional slot duration is idle (Y), go to step 4. Else (N), go to step 5 (S450).

Step 4) If N=0 (Y) (S430), stop CAP (S432). Else (N), go to step 2.

Step 5) Sense the channel until a busy sensing slot is detected within the additional defer duration Td or all slots of the additional defer duration Td are sensed as idle (S460).

Step 6) If the channel is sensed as idle for all slot durations of the additional defer duration Td (Y), go to step 4. Else (N), go to step 5 (S470).

Table 5 illustrates that mp, a minimum CW, a maximum CW, a maximum channel occupancy time (MCOT), and an allowed CW size applied to a CAP vary according to channel access priority classes.

TABLE 5

| Channel Access Priority Class (p) | mp | CWmin,p | CWmax,p | Tulmcot,p | allowed CWp sizes |
|---|---|---|---|---|---|
| 1 | 2 | 3 | 7 | 2 ms | {3,7} |
| 2 | 2 | 7 | 15 | 4 ms | {7,15} |
| 3 | 3 | 15 | 1023 | 6 or 10 ms | {15,31,63,127, 255,511,1023} |
| 4 | 7 | 15 | 1023 | 6 or 10 ms | {15,31,63,127, 255,511,1023} |

The defer duration Td includes a duration Tf (16 us) immediately followed by mp consecutive slot durations where each slot duration Tsl is 9 us, and Tf includes a sensing slot duration Tsl at the start of the 16-us duration. CWWmin,p<=CWp<=CWmax,p. CWp is set to CWmin,p, and may be updated before Step 1 based on an explicit/implicit reception response to a previous UL burst (e.g., PUSCH) (CW size update). For example, CWp may be initialized to CWmin,p based on an explicit/implicit reception response to the previous UL burst, may be increased to the next higher allowed value, or may be maintained to be an existing value.

In the Type 2 UL CAP, the length of a time period spanned by sensing slots sensed as idle before transmission(s) is deterministic. Type 2 UL CAPs are classified into Type 2A UL CAP, Type 2B UL CAP, and Type 2C UL CAP. In the Type 2A UL CAP, the UE may transmit a signal immediately after the channel is sensed as idle during at least a sensing duration Tshort_dl (=25 us). Tshort_dl includes a duration Tf (=16 us) and one immediately following sensing slot duration. In the Type 2A UL CAP, Tf includes a sensing slot at the start of the duration. In the Type 2B UL CAP, the UE may transmit a signal immediately after the channel is sensed as idle during a sensing slot duration Tf (=16 us). In the Type 2B UL CAP, Tf includes a sensing slot within the last 9 us of the duration. In the Type 2C UL CAP, the UE does not sense a channel before a transmission.

To allow the UE to transmit UL data in the unlicensed band, the BS should succeed in an LBT operation to transmit a UL grant in the unlicensed band, and the UE should also succeed in an LBT operation to transmit the UL data. That is, only when both of the BS and the UE succeed in their LBT operations, the UE may attempt the UL data transmission. Further, because a delay of at least 4 msec is involved between a UL grant and scheduled UL data in the LTE system, earlier access from another transmission node coexisting in the unlicensed band during the time period may defer the scheduled UL data transmission of the UE. In this context, a method of increasing the efficiency of UL data transmission in an unlicensed band is under discussion.

To support a UL transmission having a relatively high reliability and a relatively low time delay, NR also supports CG type 1 and CG type 2 in which the BS preconfigures time, frequency, and code resources for the UE by higher-layer signaling (e.g., RRC signaling) or both of higher-layer signaling and L1 signaling (e.g., DCI). Without receiving a UL grant from the BS, the UE may perform a UL transmission in resources configured with type 1 or type 2. In type 1, the periodicity of a CG, an offset from SFN=0, time/frequency resource allocation, a repetition number, a DMRS parameter, an MCS/TB size (TBS), a power control parameter, and so on are all configured only by higher-layer signaling such as RRC signaling, without L1 signaling. Type 2 is a scheme of configuring the periodicity of a CG and a power control parameter by higher-layer signaling such as RRC signaling and indicating information about the remaining resources (e.g., the offset of an initial transmission timing, time/frequency resource allocation, a DMRS parameter, and an MCS/TBS) by activation DCI as L1 signaling.

The biggest difference between autonomous uplink (AUL) of LTE LAA and a CG of NR is a HARQ-ACK feedback transmission method for a PUSCH that the UE has transmitted without receiving a UL grant and the presence or absence of UCI transmitted along with the PUSCH. While a HARQ process is determined by an equation of a symbol index, a symbol periodicity, and the number of HARQ processes in the CG of NR, explicit HARQ-ACK feedback information is transmitted in AUL downlink feedback information (AUL-DFI) in LTE LAA. Further, in LTE LAA, UCI including information such as a HARQ ID, an NDI, and an RV is also transmitted in AUL UCI whenever AUL PUSCH transmission is performed. In the case of the CG of NR, the BS identifies the UE by time/frequency resources and DMRS resources used for PUSCH transmission, whereas in the case of LTE LAA, the BS identifies the UE by a UE ID explicitly included in the AUL UCI transmitted together with the PUSCH as well as the DMRS resources.

Now, DL signal transmission in the U-band will be described with reference to FIG. 6.

The BS may perform one of the following U-band access procedures (e.g., channel access procedures (CAPs)) to transmit a DL signal in the U-band.

(1) Type 1 DL CAP Method

In a Type 1 DL CAP, the length of a time duration spanned by sensing slots that are sensed to be idle before transmission(s) is random. The Type 1 DL CAP may be applied to the following transmissions:

- (i) transmission(s) initiated by the BS, including (i) a unicast PDSCH with user plane data, or (ii) a unicast PDSCH with user plane data and a unicast PDCCH scheduling the user plane data; or
- transmission(s) initiated by the BS, including (i) only a discovery burst, or (ii) a discovery burst multiplexed with non-unicast information.

Referring to FIG. 6, the BS may first sense whether a channel is idle for a sensing slot duration of a defer duration Td. Next, if a counter N is decremented to 0, transmission may be performed (S434). The counter N is adjusted by sensing the channel for additional slot duration(s) according to the following procedures.

Step 1) Set N=Ninit where Ninit is a random number uniformly distributed between 0 and CWp, and go to step 4 (S420).

Step 2) If N>0 and the BS chooses to decrement the counter, set N=N−1 (S440).

Step 3) Sense the channel for an additional slot duration, and if the additional slot duration is idle (Y), go to step 4. Else (N), go to step 5 (S450).

Step 4) If N=0 (Y), stop a CAP (S432)). Else (N), go to step 2 (S430).

Step 5) Sense the channel until a busy sensing slot is detected within the additional defer duration Td or all slots of the additional defer duration Td are sensed to be idle (S460).

Step 6) If the channel is sensed to be idle for all slot durations of the additional defer duration Td (Y), go to step 4. Else (N), go to step 5 (S470).

Table 6 illustrates that mp, a minimum CW, a maximum CW, an MCOT, and an allowed CW size, which are applied to a CAP, vary according to channel access priority classes.

TABLE 6

| Channel Access Priority Class (p) | $m_p$ | CWmin,p | CWmax,p | Tmcot,p | allowed CWp sizes |
|---|---|---|---|---|---|
| 1 | 1 | 3 | 7 | 2 ms | {3,7} |
| 2 | 1 | 7 | 15 | 3 ms | {7,15} |
| 3 | 3 | 15 | 63 | 8 or 10 ms | {15,31,63} |
| 4 | 7 | 15 | 1023 | 8 or 10 ms | {15,31,63,127, 255,511,1023} |

The defer duration Td includes a duration Tf (16 μs) immediately followed by mp consecutive sensing slot durations where each sensing slot duration Tsl is 9 μs, and Tf includes the sensing slot duration Tsl at the start of the 16-μs duration.

CWmin,p<=CWp<=CWmax,p. CWp is set to CWmin,p, and may be updated (CW size update) before Step 1 based on HARQ-ACK feedback (e.g., ratio of ACK signals or NACK signals) for a previous DL burst (e.g., PDSCH). For example, CWp may be initialized to CWmin,p based on HARQ-ACK feedback for the previous DL burst, may be increased to the next highest allowed value, or may be maintained at an existing value.

(2) Type 2 DL CAP Method

In a Type 2 DL CAP, the length of a time duration spanned by sensing slots sensed to be idle before transmission(s) is deterministic. Type 2 DL CAPs are classified into Type 2A DL CAP, Type 2B DL CAP, and Type 2C DL CAP.

The Type 2A DL CAP may be applied to the following transmissions. In the Type 2A DL CAP, the BS may transmit a signal immediately after a channel is sensed to be idle during at least a sensing duration Tshort_dl=25 μs. Tshort_dl includes a duration Tf (=16 μs) and one immediately following sensing slot duration. Tf includes the sensing slot at the start of the duration.

Transmission(s) initiated by the BS, including (i) only a discovery burst, or (ii) a discovery burst multiplexed with non-unicast information, or Transmission(s) of the BS after a gap of 25 μs from transmission(s) by the UE within shared channel occupancy.

The Type 2B DL CAP is applicable to transmission(s) performed by the BS after a gap of 16 μs from transmission(s) by the UE within shared channel occupancy. In the Type 2B DL CAP, the BS may transmit a signal immediately after a channel is sensed to be idle during Tf=16 μs. Tf includes a sensing slot within the last 9 μs of the duration. The Type 2C DL CAP is applicable to transmission(s) performed by the BS after a maximum of a gap of 16 μs from transmission(s) by the UE within shared channel occupancy. In the Type 2C DL CAP, the BS does not sense a channel before performing transmission.

In a wireless communication system supporting a U-band, one cell (or carrier (e.g., CC)) or BWP configured for the UE may consist of a wideband having a larger BW than in legacy LTE. However, a BW requiring CCA based on an independent LBT operation may be limited according to regulations. If a subband (SB) in which LBT is individually performed is defined as an LBT-SB, a plurality of LBT-SBs may be included in one wideband cell/BWP. A set of RBs constituting an LBT-SB may be configured by higher-layer (e.g., RRC) signaling. Accordingly, one or more LBT-SBs may be included in one cell/BWP based on (i) the BW of the cell/BWP and (ii) RB set allocation information.

Figure 10:
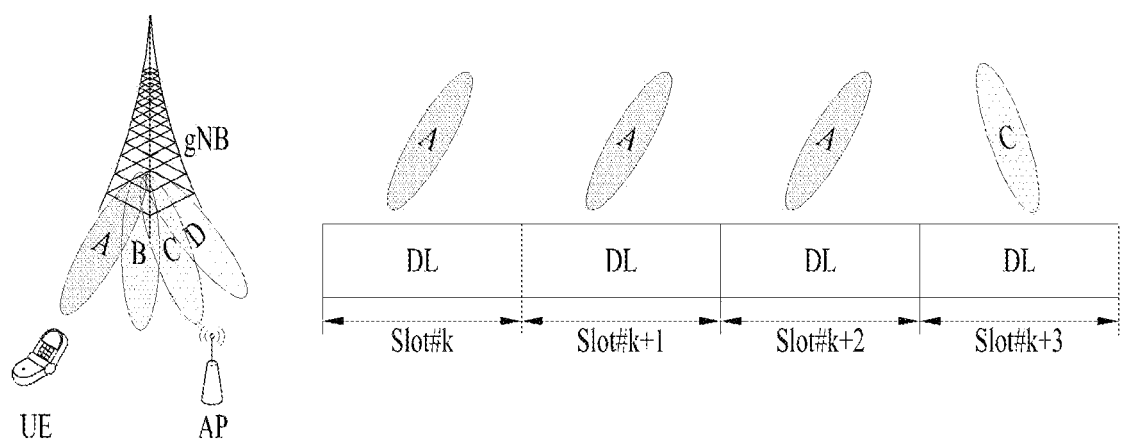
FIG. 10 is a diagram illustrating a problem occurring while beam-based LBT is performed according to an embodiment of the present disclosure.

FIG. 10 illustrates that a plurality of LBT-SBs is included in a U-band.

Figure 7:
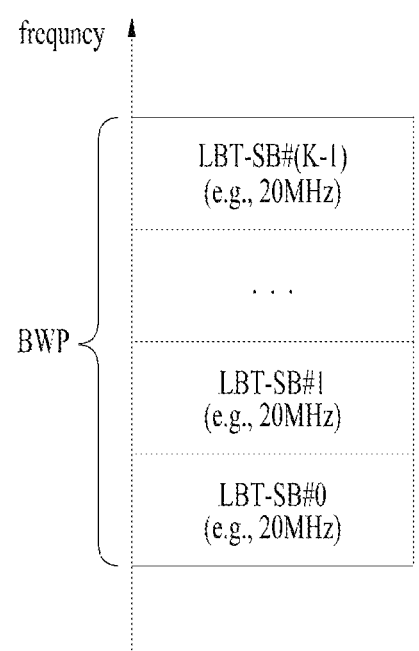
FIG. 7 is a diagram illustrating a plurality of listen-before-talk subbands (LBT-SBs) applicable to the present disclosure.

Referring to FIG. 7, a plurality of LBT-SBs may be included in the BWP of a cell (or carrier). An LBT-SB may be, for example, a 20-MHz band. The LBT-SB may include a plurality of contiguous (P)RBs in the frequency domain and thus may be referred to as a (P)RB set. Although not illustrated, a guard band (GB) may be included between the LBT-SBs. Therefore, the BWP may be configured in the form of {LBT-SB #0 (RB set #0)+GB #0+LBT-SB #1 (RB set #1+GB #1)+ . . . +LBT-SB #(K−1) (RB set (#K−1))}. For convenience, LBT-SB/RB indexes may be configured/defined to be increased as a frequency band becomes higher starting from a low frequency band.

Energy Detection (ED) Threshold Determining Method

When a UE 1 performs channel access, such as Listen-Before-Talk (LBT) (or Clear Channel Assessment (CCA)) for UL transmission, an ED threshold ($X_{Thresh}$) may be set to a value equal to or smaller than a maximum ED threshold ($X_{Thresh\_max}$).

Here, if a higher layer parameter 'maxEnergyDetectionThreshold' is configured for the UE, $X_{Thresh\_max}$ may be set to the value of 'maxEnergyDetectionThreshold'.

If the higher layer parameter 'maxEnergyDetectionThreshold' is not configured, the UE determines a value of $X'_{Thresh\_max}$.

If a higher layer parameter 'energyDetectionThreshold-Offset' is configured for the UE, $X_{Thresh\_max}$ may be set by adjusting $X'_{Thresh\_max}$ according to an offset value indicated by 'energyDetectionThresholdOffset'.

If the higher layer parameter 'energyDetectionThreshold-Offset' is not configured for the UE, $X_{Thresh\_max}$ may be set to $X'_{Thresh\_max}$.

Here, $X'_{Thresh\_max}$ may be determined according to min ($T_{max}$+10 dB, $X_r$) when the higher layer parameter 'absenceOfAnyOtherTechnology' is configured. In this case, if $X_r$ is defined in Regulatory Requirement, a corresponding value may be used. If not, $X_r$, $T_{max}$+10 dB may be used.

Meanwhile, when the higher layer parameter 'absenceOfAnyOtherTechnology' is not configured, $X'_{Thresh\_max}$ may be determined according to Equation 4 below.

[Equation 4]

$$X'_{Thrash\_max} = \max\left\{\begin{array}{l}-72 + 10 \cdot \log10(BWMHz/20 \text{ MHz}) \text{ dBm}, \\ \min\left\{\begin{array}{l}T_{max}, \\ T_{max} - T_A + (P_H + 10 \cdot \log10(BWMHz/20 \text{ MHz}) - \\ P_{TX})\end{array}\right\}\end{array}\right\}$$

Here, $T_A$=10 dB, PH=23 dBm, $P_{TX}$ is the value based on a maximum UE output power, and $T_{max}$(dBm)=10·log 10 (3.16228·10$^{-8}$ (mW/MHz)·BWMHz (MHz)). Here, BWMHz may mean a channel bandwidth.

In addition, if the higher layer parameter 'absenceOfAnyOtherTechnology' is not configured and a higher layer parameter 'ul-toDL-COT-SharingED-Threshold' is configured for the UE, a base station should determine the transmission power of the base station based on the value of 'ul-toDL-COT-SharingED-Threshold'.

In addition, if the UE performs Type 1 Channel Access Procedure (CAP) (e.g., Cat-3 LBT or Cat-4 LBT) and UL transmission does not include Configured Grant-Uplink Control Information (CG-UCI) or it is indicated that Channel Occupancy Time (COT) sharing is available while the UL transmission includes CG-UCI, $X_{Thresh\_max}$ is set to the same value as the value of 'ul-toDL-COT-SharingED-Threshold'.

In the NR system, a massive multiple input multiple output (MIMO) environment in which the number of transmission/reception (Tx/Rx) antennas is significantly increased may be under consideration. That is, as the massive MIMO environment is considered, the number of Tx/Rx antennas may be increased to a few tens or hundreds. The NR system supports communication in an above 6 GHz band, that is, a millimeter frequency band. However, the millimeter frequency band is characterized by the frequency property that a signal is very rapidly attenuated according to a distance due to the use of too high a frequency band. Therefore, in an NR system operating at or above 6 GHz, beamforming (BF) is considered, in which a signal is transmitted with concentrated energy in a specific direction, not omnidirectionally, to compensate for rapid propagation attenuation. Accordingly, there is a need for hybrid BF with analog BF and digital BF in combination according to a position to which a BF weight vector/precoding vector is applied, for the purpose of increased performance, flexible resource allocation, and easiness of frequency-wise beam control in the massive MIMO environment.

Figure 8:
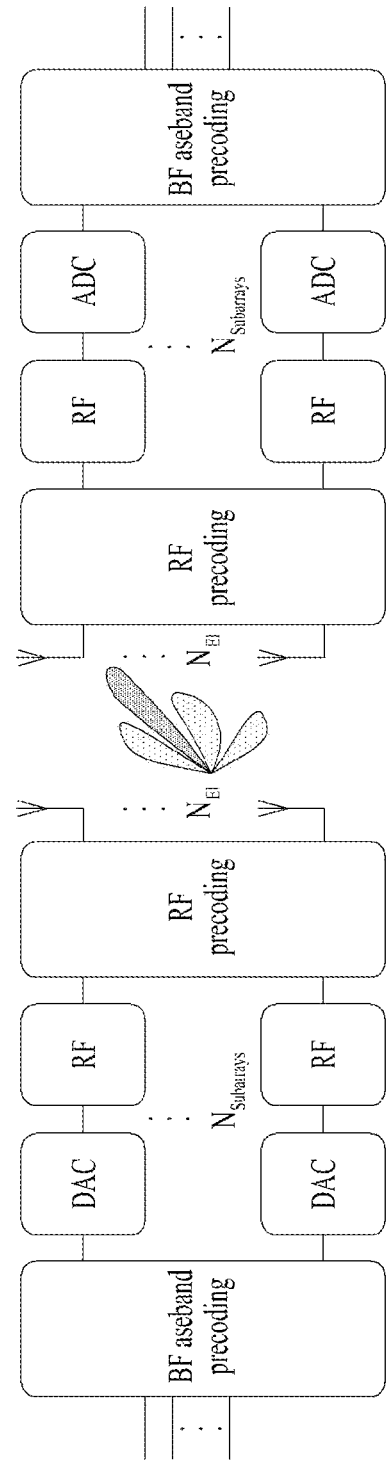
FIG. 8 is a diagram illustrating analog beamforming in the NR system.

FIG. 8 is a block diagram illustrating an exemplary transmitter and receiver for hybrid BF.

To form a narrow beam in the millimeter frequency band, a BF method is mainly considered, in which a BS or a UE transmits the same signal through multiple antennas by applying appropriate phase differences to the antennas and thus increasing energy only in a specific direction. Such BF methods include digital BF for generating a phase difference for digital baseband signals, analog BF for generating phase differences by using time delays (i.e., cyclic shifts) for modulated analog signals, and hybrid BF with digital BF and analog beamforming in combination. Use of a radio frequency (RF) unit (or transceiver unit (TXRU)) for antenna element to control transmission power and phase control on antenna element basis enables independent BF for each frequency resource. However, installing TXRUs in all of about 100 antenna elements is less feasible in terms of cost. That is, a large number of antennas are required to compensate for rapid propagation attenuation in the millimeter frequency, and digital BF needs as many RF components (e.g., digital-to-analog converters (DACs), mixers, power amplifiers, and linear amplifiers) as the number of antennas. As a consequence, implementation of digital BF in the millimeter frequency band increases the prices of communication devices. Therefore, analog BF or hybrid BF is considered, when a large number of antennas are needed as is the case with the millimeter frequency band. In analog BF, a plurality of antenna elements are mapped to a single TXRU and a beam direction is controlled by an analog phase shifter. Because only one beam direction is generated across a total band in analog BF, frequency-selective BF may not be achieved with analog BF. Hybrid BF is an intermediate form of digital BF and analog BF, using B RF units fewer than Q antenna elements. In hybrid BF, the number of beam directions available for simultaneous transmission is limited to B or less, which depends on how B RF units and Q antenna elements are connected.

Beam Management (BM)

The BM refers to a series of processes for acquiring and maintaining a set of BS beams (transmission and reception point (TRP) beams) and/or a set of UE beams available for DL and UL transmission/reception. The BM may include the following processes and terminology.

Beam measurement: an operation by which the BS or UE measures the characteristics of a received beamformed signal Beam determination: an operation by which the BS or UE selects its Tx/Rx beams Beam sweeping: an operation of covering a spatial domain by using Tx and/or Rx beams for a prescribed time interval according to a predetermined method Beam report: an operation by which the UE reports information about a signal beamformed based on the beam measurement.

The BM procedure may be divided into (1) a DL BM procedure using an SSB or CSI-RS and (2) a UL BM procedure using an SRS. Further, each BM procedure may include Tx beam sweeping for determining a Tx beam, and Rx beam sweeping for determining an Rx beam.

The DL BM procedure may include (1) transmission of beamformed DL RSs (e.g., CSI-RS or SSB) from the BS and (2) beam reporting from the UE.

A beam report may include preferred DL RS ID(s) and reference signal received power(s) (RSRP(s)) corresponding to the preferred DL RS ID(s). A DL RS ID may be an SSB resource indicator (SSBRI) or a CSI-RS resource indicator (CRI).

2. DL BM-Related Beam Indication

The UE may receive at least a list of up to M candidate transmission configuration indication (TCI) states for QCL indication by RRC signaling. M depends on a UE capability and may be 64.

Each TCI state may be configured with one RS set. Table 7 describes an example of a TCI-State IE. The TC-State IE is related to a QCL type corresponding to one or two DL RSs.

TABLE 7

```
-- ASN1START
-- TAG-TCI-STATE-START
TCI-State ::=                    SEQUENCE {
   tci-StateId                      TCI-StateId,
   qcl-Type1                        QCL-Info,
   qcl-Type2                        QCL-Info
      OPTIONAL, -- Need R
   ...
}
QCL-Info ::=                     SEQUENCE {
   cell                             ServCellIndex
     OPTIONAL, -- Need R
   bwp-Id                           BWP-Id
        OPTIONAL, -- Cond CSI-RS-Indicated
   referenceSignal                  CHOICE {
      csi-rs                           NZP-CSI-RS-
ResourceId,
      ssb                              SSB-Index
   },
   qcl-Type                         ENUMERATED {typeA,
typeB, typeC, typeD},
   ...
}
-- TAG-TCI-STATE-STOP
-- ASN1STOP
```

In Table 7, 'bwp-Id' identifies a DL BWP in which an RS is located, 'cell' indicates a carrier in which the RS is located, and 'referencesignal' indicates reference antenna port(s) serving as a QCL source for target antenna port(s) or an RS including the reference antenna port(s). The target antenna port(s) may be for a CSI-RS, PDCCH DMRS, or PDSCH DMRS.

3. Quasi-Co Location (QCL)

The UE may receive a list of up to M TCI-State configurations to decode a PDSCH according to a detected PDCCH carrying DCI intended for a given cell. M depends on a UE capability.

As described in Table 7, each TCI-State includes a parameter for establishing the QCL relationship between one or more DL RSs and a PDSCH DM-RS port. The QCL relationship is established with an RRC parameter qcl-Type1 for a first DL RS and an RRC parameter qcl-Type2 for a second DL RS (if configured).

The QCL type of each DL RS is given by a parameter 'qcl-Type' included in QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

For example, if a target antenna port is for a specific NZP CSI-RS, the NZP CSI-RS antenna port may be indicated/configured as QCLed with a specific TRS from the perspective of QCL-Type A and with a specific SSB from the perspective of QCL-Type D. Upon receipt of this indication/configuration, the UE may receive the NZP CSI-RS using a Doppler value and a delay value which are measured in a QCL-TypeA TRS, and apply an Rx beam used to receive a QCL-Type D SSB for reception of the NZP CSI-RS UL BM Procedure In UL BM, beam reciprocity (or beam correspondence) between Tx and Rx beams may or may not be established according to the implementation of the UE. If the Tx-Rx beam reciprocity is established at both the BS and UE, a UL beam pair may be obtained from a DL beam pair. However, if the Tx-Rx beam reciprocity is established at neither the BS nor UE, a process for determining a UL beam may be required separately from determination of a DL beam pair.

In addition, even when both the BS and UE maintain the beam correspondence, the BS may apply the UL BM procedure to determine a DL Tx beam without requesting the UE to report its preferred beam.

The UL BM may be performed based on beamformed UL SRS transmission. Whether the UL BM is performed on a set of SRS resources may be determined by a usage parameter (RRC parameter). If the usage is determined as BM, only one SRS resource may be transmitted for each of a plurality of SRS resource sets at a given time instant.

The UE may be configured with one or more SRS resource sets (through RRC signaling), where the one or more SRS resource sets are configured by SRS-ResourceSet (RRC parameter). For each SRS resource set, the UE may be configured with K≥1 SRS resources, where K is a natural number, and the maximum value of K is indicated by SRS_capability.

The UL BM procedure may also be divided into Tx beam sweeping at the UE and Rx beam sweeping at the BS similarly to DL BM.

In proposed methods to be described later, a beam may mean an area for performing a specific operation (e.g., LBT or transmission) by concentrating power in a specific direction and/or in a specific space. In other words, the UE or the BS may perform an operation such as LBT (Listen Before Talk) or transmission by targeting a specific area (i.e., a beam) corresponding to a specific space and/or a specific direction. Thus, each beam may correspond to each space and/or each direction. In addition, the UE or the BS may use a spatial domain filter corresponding to each space and/or each direction in order to use each beam. That is, one spatial domain filter may correspond to one or more beams. The UE or the BS may perform an operation such as LBT or transmission using the spatial domain filter corresponding to a beam (or space and/or direction) to be used.

For example, the UE or the BS may perform LBT using a spatial domain filter corresponding to an LBT beam in a space and/or a direction for the corresponding LBT beam or perform DL/UL transmission using a spatial domain filter corresponding to a Tx beam in a space and/or a direction for the corresponding Tx beam.

In a high-frequency band of 52.6 GHz or higher, Omnidirectional LBT (hereinafter O-LBT) that performs LBT omnidirectionally through techniques such as analog beamforming using multiple antennas due to path loss relatively larger than that in low frequency band and Directional LBT (hereinafter D-LBT) that performs Listen-Before-Talk (LBT) only in a specific beam direction with omnidirectional transmission and reception may be taken into consideration.

In this case, since O-LBT and D-LBT differ in area and direction for performing LBT, it is necessary to set different Energy Detection (ED) thresholds for determining IDLE/BUSY of a channel through energy measurement. In addition, since LBT has a directionality, if beams in different directions are multiplexed within COT acquired through D-LBT success or DL/UL beams are used for DL/UL transmission and reception through DL/UL switching, the LBT performed direction and the ED thresholds are closely related, appropriate ED threshold setting and multiplexing methods are needed.

A typical CAP performed for transmission in a U-band is LBT. LBT is a mechanism that prevents collision between transmissions by allowing transmission of a corresponding signal when a noise level is less than a certain level as a result of comparing a surrounding interference level measured by the BS and/or the UE that is to transmit signals with a specific threshold such as an ED threshold.

Figure 9A:
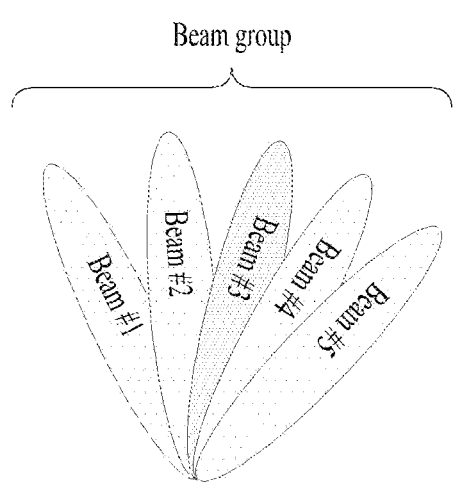
FIGS. 9A and 9B are diagrams illustrating beam-based LBT and group-based LBT according to an embodiment of the present disclosure.
Figure 9B:
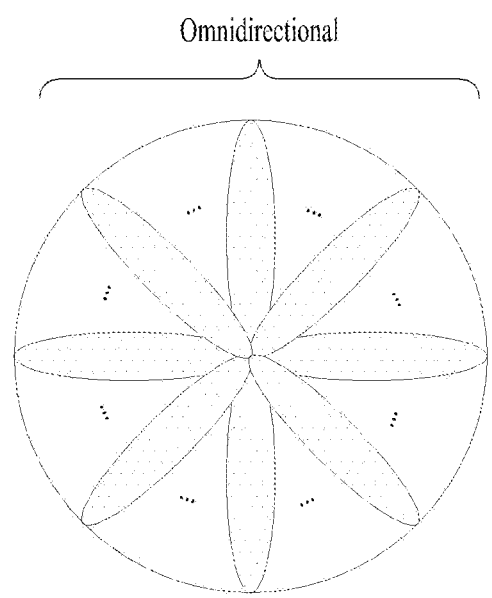

FIGS. 9A and 9B illustrate exemplary D-LBT and exemplary O-LBT.

FIG. 9A illustrates D-LBT including specific beam direction LBT and/or beam group unit LBT, and FIG. 9B illustrates O-LBT.

In a legacy NR-U system (e.g., Rel-16 NR-U), a DL/UL signal/channel has been transmitted if it is determined that a channel is idle by performing a CAP (i.e., LBT) as described with reference to FIGS. 9A and 9B. On the other hand, in the legacy NR-U system, an LBT band has been aligned with LBT bands of other RATs for coexistence with other RATs (e.g., Wi-Fi), and the CAP (i.e., LBT) has been performed omnidirectionally. In other words, non-directional LBT has been performed in the legacy NR-U system.

However, Rel-17 NR-U for transmitting the DL/UL signal/channel in a higher band (e.g., a band of 52.6 GHz or higher) than a U-band of 7 GHz used in the legacy NR-U system may utilize directional LBT (D-LBT) which transmits the signal/channel by concentrating energy in a specific beam direction in order to overcome path loss larger than in the band of 7 GHz used in the legacy system. That is, in Rel-17 NR-U, the DL/UL signal/channel may be transmitted over wider coverage by reducing path loss through D-LBT, and efficiency may be improved even in coexistence with other RATs (e.g., WiGig).

Referring to FIG. 9A, when a beam group consists of beams #1 to #5, performing LBT based on beams #1 to #5 may be referred to as beam group unit LBT. In addition, performing LBT through any one (e.g., beam #3) of beams

1 to #5 may be referred to as specific beam direction LBT. In this case, beams #1 to #5 may be continuous (or adjacent) beams but may also be discontinuous (or non-adjacent) beams. Further, the number of beams included in the beam group is not necessarily plural, and a single beam may form one beam group.

FIG. 9B illustrates O-LBT. When omnidirectional beams constitute one beam group and perform LBT in units of the corresponding beam group, this may be interpreted as performing omnidirectional LBT (O-LBT). In other words, if beams of all directions, i.e., omnidirectional beams which are a set of beams covering a specific sector in a cell, are included in one beam group, this may mean O-LBT.

In other words, in the case of a high frequency band, coverage may be limited due to significant path loss. In order to overcome such a coverage problem, a multi-antenna technique may be used. For example, narrow-beam transmission in which a signal is transmitted by concentrating energy in a specific direction, rather than omnidirectional transmission, may be performed.

In a high-frequency U-band, along with a CAP such as LBT described above, beam-based transmission combined therewith needs to be considered. For example, in order to perform D-LBT in a specific direction, D-LBT may be performed only in the corresponding direction or LBT may be performed in units of a beam group including a beam of the corresponding direction. Then, if a channel is determined to be idle, transmission may be performed. Here, the beam group may include a single beam or a plurality of beams. If the beam group includes omnidirectional beams, D-LBT may be extended to O-LBT.

Since the beam-based transmission above concentrates energy in a specific direction to transmit signals, the interference impact on base stations/UEs located nearby (excluding nodes located in the transmission direction) may be relatively small in comparison with omnidirectional transmission. In other words, it may be thought that spectral sharing is made naturally because beam-based transmission only interferes in a specific direction. Therefore, if certain conditions are met, beam-based transmission may be performed without performing LBT to increase channel access occasions and improve system performance.

Information on a beam group including beams and at least one beam included in each beam group may be configured, and a Contention Window Size (CWS) and a back-off counter value may be managed for an individual beam or each beam group. Therefore, an events such as CWS reset/increase, back-off counter reduction, etc. may affect between each beam and a beam group containing each beam when LBT is performed. For example, as the feedback on data transmitted through a specific beam direction LBT is NACK, if CWS value for the corresponding beam direction increases, the corresponding CWS increase is also reflected in the CWS managed in the beam group including the corresponding beam, so that the CWS value for the beam group may increase. On the other hand, even if the CWS value for the corresponding beam direction increases, the CWS value for the beam group may be independently managed without affecting the beam group including the corresponding beam. In addition, regarding the back-off counter value managed per beam or in beam group unit, as described above, the per-beam back-off counter value and the back-off counter value of the beam group may also be managed independently and affect each other by being dependent on each other.

In addition, per-beam-LBT and beam group LBT may be performed by switching between each other under certain conditions. In the case of UL transmission, a base station may indicate an LBT type to be used between two LBT types (i.e., per-beam LBT and beam group LBT). In the case of Configured Grant (CG) UL transmission, when resources for transmitting CG UL are configured, an LBT type to be performed in each resource may be configured together. In addition, if delay sensitive data transmission is indicated with LBT in a specific beam direction, data may not be transmitted due to LBT failure. Accordingly, channel access occasions may be increased by assigning g a plurality of LBT occasions to other beams within the beam group including the corresponding beam.

In the present disclosure, a per-beam LBT procedure or a beam group unit LBT procedure may basically mean a random back-off-based Category-3 (Cat-3) or Category-4 LBT. In addition, the per-beam LBT performs carrier sensing in a specific beam direction and makes a comparison with ED threshold. If the energy measured through the carrier sensing is lower than the ED threshold, the LBT may regard a channel of the corresponding beam direction as IDLE. If the energy measured through the carrier sensing is higher than the ED threshold, the LBT may determine that a channel of the corresponding beam direction is BUSY.

The beam group LBT procedure is to perform the above-described LBT procedure in all beam directions included in the beam group. If a beam (e.g., a representative beam) in a specific direction configured/indicated in advance exists within the beam group, a random back-off-based LBT procedure may be performed representatively using the corresponding beam in a manner similar to multi-CC LBT, and Category-1 (Cat-1) or Category-2 (Cat-2) LBT rather than the random back-off-based LBT is performed on the rest of the beams included in the beam group. Thus, it may mean that a signal is transmitted when the LBT is successful. Meanwhile, in the beam group LBT procedure, according to the regulation of each country/region, a random back-off-based LBT procedure is performed through a representative beam, and signals may be transmitted through the rest of the beams included in the beam group, respectively, without performing LBT (no-LBT).

Before a description of proposed methods, NR-based channel access schemes for an unlicensed band used in the present disclosure are classified as follows.

Category 1 (Cat-1): the next transmission immediately follows the previous transmission after a switching gap within a COT, and the switching gap is shorter than 16 us, including even a transceiver turn-around time. Cat-1 LBT may correspond to the above-described Type 2C CAP.

Category 2 (Cat-2): an LBT method without backoff. Once a channel is confirmed to be idle during a specific time period shortly before transmission, the transmission may be performed immediately. Cat-2 LBT may be subdivided according to the length of a minimum sensing duration required for channel sensing immediately before a transmission. For example, Cat-2 LBT with a minimum sensing duration of 25 us may correspond to the above-described Type 2A CAP, and Cat-2 LBT with a minimum sensing duration of 16 us may correspond to the above-described Type 2B CAP. The minimum sensing durations are merely exemplary, and a minimum sensing duration less than 25 us or 16 us (e.g., a minimum sensing duration of 9 us) may also be available.

Category 3 (Cat-3): an LBT method with fixed contention window size (CWS) i-based backoff. A transmitting entity selects a random number N in a range of 0 to a (fixed) maximum CWS value and decrements a counter value each time it determines that a channel is idle. When the counter value reaches 0, the transmitting entity is allowed to perform a transmission.

Category 4 (Cat-4): an LBT method with variable CWS-based backoff. A transmitting entity selects a random number N in a range of 0 to a (variable) maximum CWS value and decrements a counter value, each time it determines that a channel is idle. When the counter value reaches 0, the transmitting entity is allowed to perform a transmission. If the transmitting entity receives a feedback indicating reception failure of the transmission, the transmitting entity increases the maximum CWS value by one level, selects a random number again within the increased CWS value, and performs an LBT procedure. Cat-4 LBT may correspond to the above-described Type 1 CAP.

The definition of a QCL described in the present disclosure may follow one of the above-described definitions of a QCL. In addition, similarly, the QCL concept definition may be modified into a form that can assume as transmitted from a co-location between antenna ports where the QCL assumption is established (e.g., a form that a UE can assume antenna ports transmitted at the same transmission point), and the idea of the present disclosure includes similar modification examples like this. In the present disclosure, the above QCL-related definitions are used interchangeably for convenience of description.

By the above definition, a UE cannot assume the same large-scale channel properties between the antenna ports for "non-quasi-co-located (NQC) antenna ports". Namely, in this case, a typical UE receiver should perform independent processing for each configured non-quasi-co-located (NQC) antenna port for timing acquisition and tracking, frequency offset estimation and compensation, delay estimation, Doppler estimation, etc. There is an advantage in that the following operation of the UE may be performed between antenna ports capable of assuming QCL.

For delay spread & Doppler spread, a UE may apply the power-delay-profile, delay spread and Doppler spectrum, and Doppler spread estimation results for one antenna port equally to Wiener filters used for channel estimation for other antenna ports.

For frequency shift & received Timing, a UE may perform time and frequency synchronization for one antenna and then apply the same synchronization to demodulation of another antenna port.

For average received power, a UE may use an average value of RSRP measurement values for a plurality of antenna ports.

On the other hand, if beam reciprocity is established between a DL beam and a UL beam, either a procedure for determining a DL beam pair or a procedure for determining a UL beam pair may be omitted. This may equally apply to a case that beam correspondence is established as well.

Here, the establishment of beam reciprocity (or beam correspondence) may mean assuming that a BS Tx beam and a BS Rx beam match in communication between a BS and a UE and that a UE Tx beam and a UE Rx beam match in the communication between the BS and the UE. Here, the BS Tx beam and the BS Rx beam may mean a DL Tx beam and a DL Rx beam, respectively, and the UE Tx beam and the UE Rx beam may mean a UL Tx beam and a UL Rx beam, respectively. Here, a Tx beam may mean a transmission beam, and an Rx beam may mean a reception beam.

For the following reasons, it may be preferable to configure all DL signals/channels (or UL signals/channels) included in one TX burst with signals/channels having spatial (partial) QCL relationships. For example, in transmitting a TX burst consisting of total four slots after succeeding in LBT, as shown in FIG. 10, a BS may transmit it in a fourth slot in a beam-C direction after transmitting it during three slots in a beam-A direction.

Yet, while the BS transmits a signal in the beam-A direction, a Wi-Fi AP coexisting in a corresponding U-band does not detect the signal transmitted in the beam-A direction. Therefore, after determining that a channel is IDLE, the Wi-Fi AP may succeed in LBT and then start transmitting and receiving signals. In doing so, when the BS transmits a signal in the beam-C direction from slot #k+3, it may act as interference on a signal of the corresponding Wi-Fi. Like this case, since the BS used to make a transmission with a beam A makes a transmission by changing a beam direction without additional LBT so as to cause interference with another coexisting wireless node possibly, it may be preferable not to change a direction of a Tx beam of a TX burst transmitted after the BS has succeeded in LBT.

In the NR system, a method of signaling beam information to be used by a UE for UL transmission and reception by associating DL signals and UL signals is considered. For example, if there is a beam direction generated by a UE in a Channel State Information-Reference Signal (CSI-RS) resource by linking the CSI-RS resource and a Sounding Reference Signal (SRS) resource together, when an SRS is transmitted in the SRS resource linked to the corresponding CSIRs resource (or when PUSCH scheduled through a UL grant on which the SRS resource linked to the corresponding CSI-RS resource is signaled is transmitted), the UE may transmit a UL signal using a Tx beam corresponding to a CSI-RS Rx beam. In doing so, the relationship between a specific Rx beam and a specific Tx beam may be configured on implementation by the UE if there is beam correspondence capability of the UE. Alternatively, the relationship between a specific Rx beam and a specific Tx beam may be configured by training between the BS and the UE if there is no beam correspondence capability of the UE.

Therefore, when an association relationship between a DL signal and a UL signal is defined, COT may be allowed to be shared between a DL TX burst consisting of DL signals/channels in a spatial (partial) QCL relationship with the corresponding DL signal and a UL TX burst consisting of UL signals/channels in a spatial (partial) QCL relationship with the UL signal associated with the corresponding DL signal.

Here, the UL signal/channel may include at least one of the following signals/channels.

SRS (sounding RS), DMRS for PUCCH, DMRS for PUSCH, PUCCH, PUSCH, and PRACH

Here, the DL signal/channel may include at least one of the following signals/channels.

PSS (Primary Synchronization Signal), SSS (Secondary SS), DMRS for PBCH, PBCH, TRS (Tracking Reference Signal) or CSI-RS for tracking, CSI-RS for CSI (Channel State Information) acquisition and CSI-RS for RRM measurement, CSI-RS for beam management, DMRS for PDCCH, DMRS for PDSCH, PDCCH (or, PDCCH transmittable CORESET (Control Resource Set)), PDSCH, and a signal introduced for the purpose of tracking or (fine) time/frequency synchronization or coexistence or power saving or frequency reuse factor=1 or the like by being disposed in front of a TX burst as the above-listed signal, a modification of the corresponding signal, or a newly introduced signal.

On the other hand, each proposed method described below may be applicable by being combined with other proposed methods together unless they are mutually contrary to each other.

Before describing the proposed methods of the present disclosure, an overall operation process of a UE, a BS and a network to implement the proposed methods of the present disclosure will be looked into.

Figure 11:
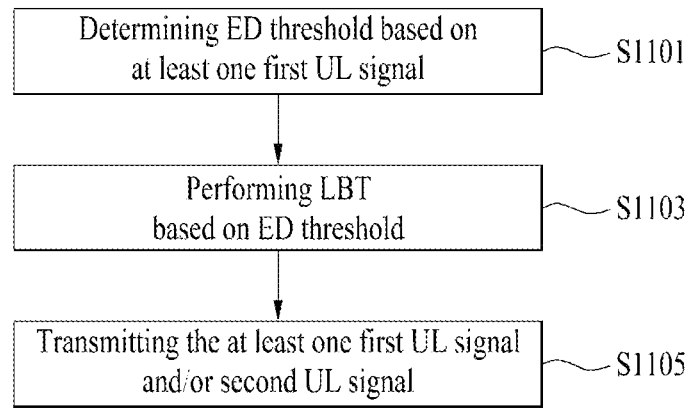
FIGS. 11 to 13 are diagrams illustrating an overall operation process for transmitting and receiving an uplink signal by a user equipment and a base station according to an embodiment of the present disclosure.
Figure 12:
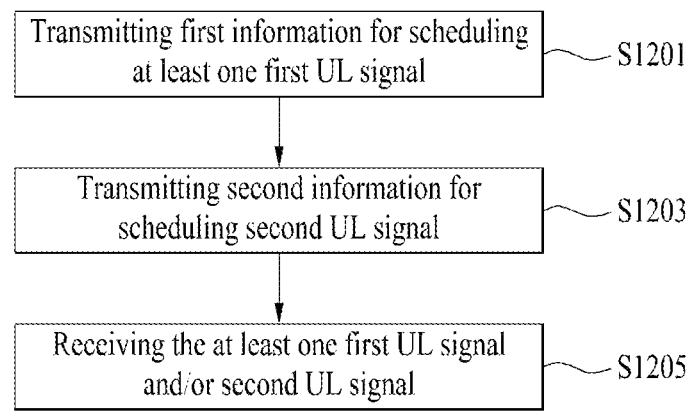
Figure 13:
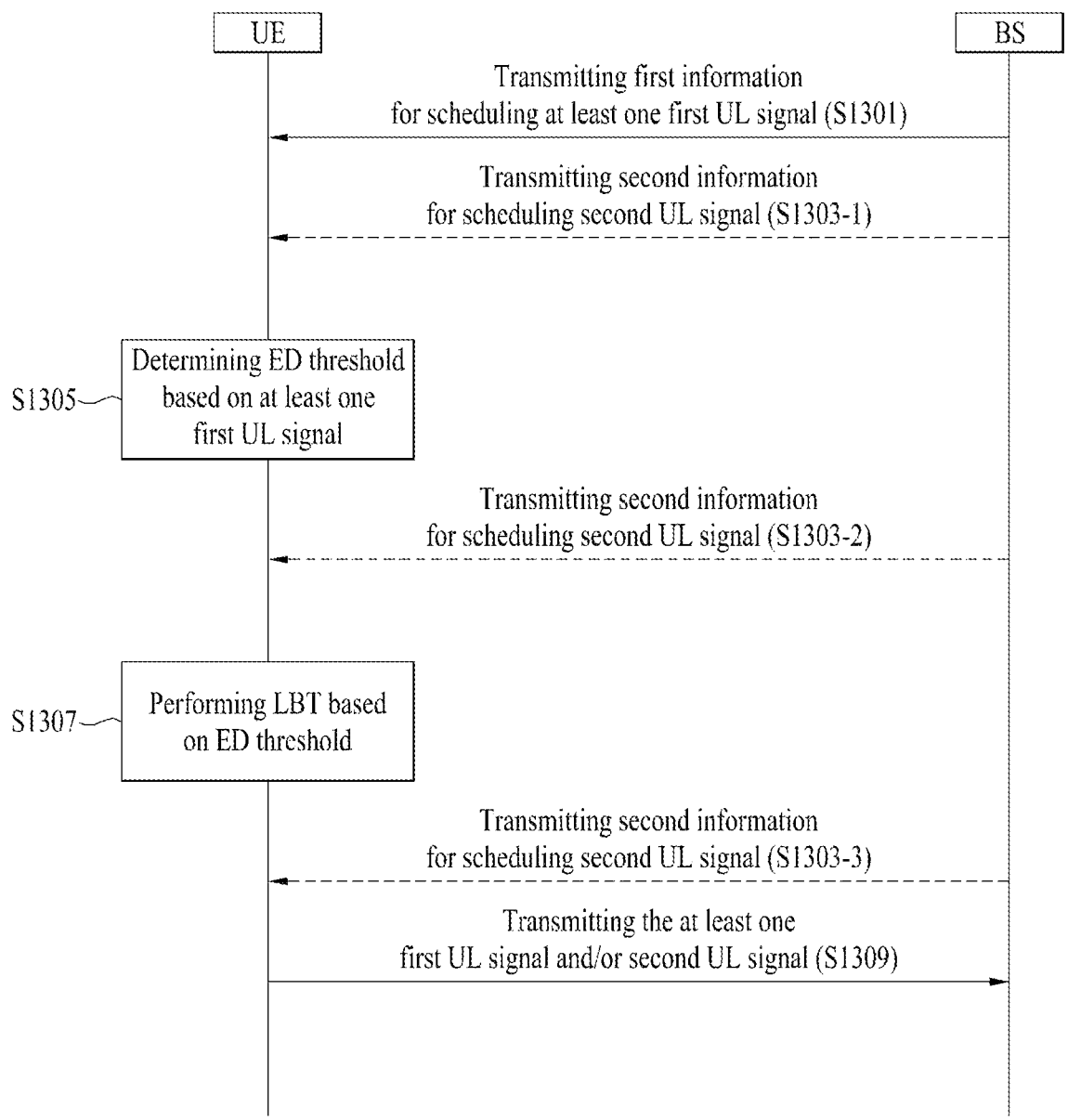

FIGS. 11 to 13 are diagrams to describe an overall operation process of a UE, a BS and a network to transmit and receive an uplink signal according to the proposed methods of the present disclosure.

Figure 14:
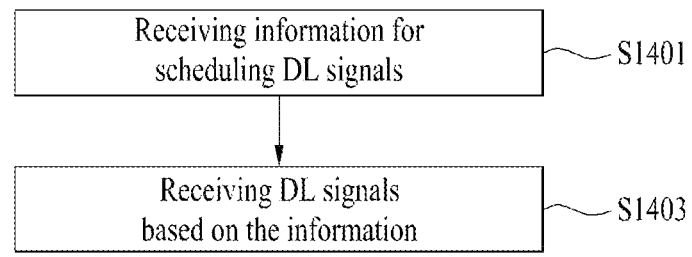
FIGS. 14 to 16 are diagrams illustrating an overall operation process for transmitting and receiving a downlink signal by a user equipment and a base station according to an embodiment of the present disclosure.
Figure 15:
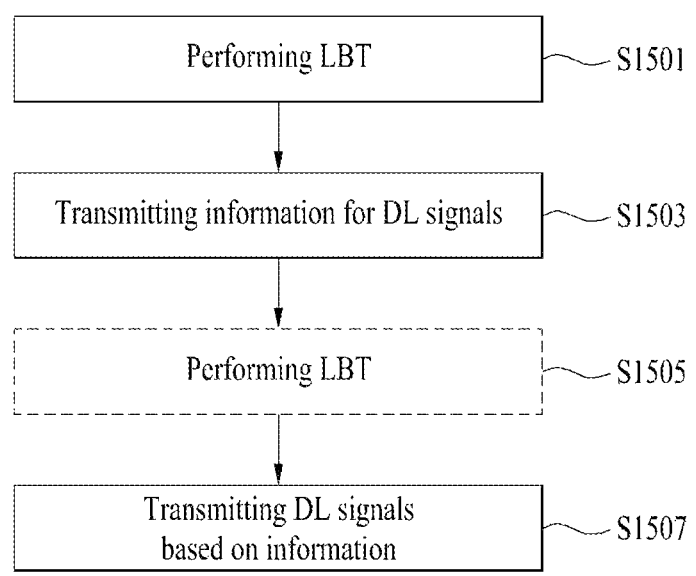
Figure 16:
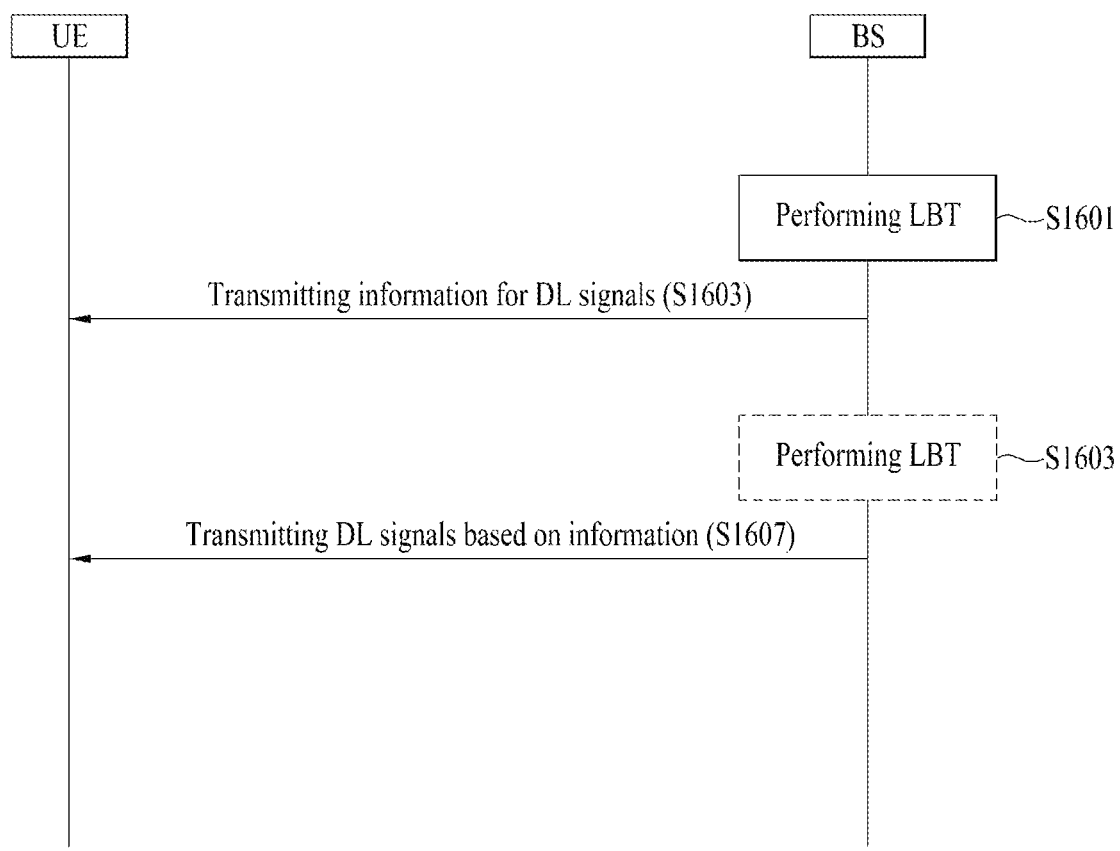

FIGS. 14 to 16 are diagrams to describe an overall operation process of a UE, a BS and a network to transmit and receive a downlink signal according to the proposed methods of the present disclosure.

FIG. 11 is a diagram to describe an operation process of a UE for transmitting an uplink signal according to the proposed methods of the present disclosure.

Referring to FIG. 11, a UE may determine an Energy Detection (ED) threshold based on at least one first UL signal (S1101). For example, the UE may determine at least one first UL signal, which is consulted to determine an ED threshold, and the ED threshold based on the at least one first UL signal based on [Proposed Method #2] and/or [Proposed Method #3].

The UE may perform a Listen-Before-Talk (LBT) based on the ED threshold (S1103). In this case, the LBT may be performed based on D-LBT. For example, the corresponding LBT may be performed based on [Proposed Method #1]. Yet, it is non-limited by [Proposed Method #1]. If a plurality of Tx beams are multiplexed and UL signals can be transmitted through the corresponding Tx beams, any method may be usable to perform LBT.

The UE may transmit at least one first UL signal and/or a second UL signal within a Channel Capacity Time (COT) acquired through the LBT. For example, at least one first UL signal and/or a second UL signal may be determined and transmitted based on [Proposed Method #2] and/or [Proposed Method #3].

FIG. 12 is a diagram to describe an operation process of a BS to receive a UL Signal according to the proposed methods of the present disclosure.

The BS may transmit a first information for scheduling at least one first UL signal [S1201].

The BS may transmit a second information for scheduling a second UL signal [S1203].

For example, a transmission timing point of the first information for scheduling the at least one first UL Signal and/or the second information for scheduling the second UL signal may be determined based on [Proposed Method #2] and/or [Proposed Method #3].

The BS may receive the at least one first UL signal and/or the second UL signal [S1205]. For example, the BS may receive the at least one first UL signal and/or the second UL signal based on [Proposed Method #2] and/or [Proposed Method #3].

FIG. 13 is a diagram illustrating an operation process of a network for transmitting and receiving uplink signals according to the proposed methods of the present disclosure.

A BS may transmit a first information for scheduling at least one first UL signal to a UE (S1301).

The UE may determine an Energy Detection (ED) threshold based on the at least one first UL signal (S1305). For example, the UE may determine at least one first UL signal referred to determine an ED threshold and the ED threshold based on the at least one first UL signal based on [Proposed Method #2] and/or [Proposed Method #3].

The UE may perform Listen-Before-Talk (LBT) based on the ED threshold (S1307). In doing so, the LBT may be performed based on D-LBT. For example, the corresponding LBT may be performed based on [Proposed Method #1]. Yet, it is non-limited by [Proposed Method #1], and any method capable of multiplexing a plurality of Tx beams and transmitting a UL signal through the corresponding Tx beams may be used to perform the LBT.

The UE may transmit at least one first UL signal and/or a second UL signal to the BS within Channel Occupancy Time (COT) acquired through the LBT. For example, the at least one first UL signal and/or the second UL signal may be determined and transmitted based on [Proposed Method #2] and/or [Proposed Method #3].

Meanwhile, the BS may transmit a second information for scheduling the second UL signal to the UE. For example, the BS may transmit the second information between a timing point of transmitting the first information is to the UE and a timing point of determining the ED threshold by the UE (S1303-1). Alternatively, the BS may transmit the second information to the UE before performing the LBT by determining the ED threshold or at a timing point of performing the LBT (S1303-3). Alternatively, the BS may transmit the second information to the UE within the COT acquired by the LBT (S1303-5). For example, the transmission and transmission timing of the second information for scheduling the second UL signal may be based on [Proposed Method #2] and/or [Proposed Method #3].

FIG. 14 is a diagram illustrating an operation process of a UE to receive a DL signal according to the proposed methods of the present disclosure.

A UE may receive an information for scheduling a DL signal (S1401). In addition, the UE may receive the DL signal based on the corresponding information (S1403). In doing so, the DL signal may be received based on [Proposed Method #1].

FIG. 15 is a diagram illustrating an operation process of a BS for transmitting a DL signal according to the proposed methods of the present disclosure.

A BS may perform LBT (S1501) and transmit an information for scheduling a DL signal (S1503). For example, the base station may perform the LBT based on [Proposed Method #1].

The BS perform LBT for DL signal transmission (S1505). For example, the BS may perform the LBT based on [Proposed Method #1]. Yet, if the DL signal is transmitted within the COT acquired by the LBT performed in the previous step, the corresponding step may be omitted or non-random back-off based LBT (e.g., Cat-1 LBT or Cat-2 LBT) may be performed. The BS may transmit the DL signal based on the corresponding information (S1507).

FIG. 16 is a diagram illustrating an operation process of a network for transmitting a DL signal according to the proposed methods of the present disclosure.

A BS may perform LBT (S1601) and transmit an information for scheduling a DL signal to a UE (S1603). For example, the BS may perform the LBT based on [Proposed Method #1].

The BS may perform LBT for DL signal transmission (S1605). For example, the BS may perform the LBT based on [Proposed Method #1]. Yet, if the DL signal is transmitted within the COT acquired by the LBT performed in the previous step, the corresponding step may be omitted or non-random back-off based LBT (e.g., Cat-1 LBT or Cat-2

LBT) may be performed. The BS may transmit the DL signal to the UE based on the corresponding information (S1607).

[Proposed Method #1]

When a BS or a UE transmits a plurality of Tx beams through Time Division Multiplexing (TDM) within a Channel Occupancy Time (COT), a method of performing per-beam LBT (for example, performing random back-off-based Cat-3 LBT or Cat-4 LBT for each sensing beam) through each of a plurality of sensing beams respectively covering directions and interference ranges of the multiplexed Tx beams will be described. In this case, each of the TDMed Tx beams may have a different direction, and some or all of the Tx beams may have the same direction. In addition, each of the sensing beams may have a different direction, and some or all of the sensing beams may have the same direction.

Meanwhile, a time T, which is a reference for performing Cat-2 LBT once again in Embodiments #1-1 to #1-4, may be preset or set through RRC. Here, the T may mean a reference time at which the validity of the per-beam LBT for all Tx beams is considered to be guaranteed. For example, the total time required for the per-beam LBT for all Tx beams is smaller than T (or less than T), which may mean that the LBT results from first Tx beams to last Tx beams may be considered valid.

On the other hand, the total time required for the per-beam LBT for all Tx beams is equal to or greater than (or greater than) T, which may mean that the validity of at least one of the LBT results from the first Tx beams to the last Tx beams may not be guaranteed. Therefore, it may mean that a presence or non-presence of IDLE of a channel should be checked once more through LBT (e.g., Cat-2 LBT) of at least short interval.

1. Embodiment #1-1

If the total time required to perform per-beam LBT through a plurality of sensing beams is equal to or smaller than T (or smaller than T), transmission may be started with a first Tx beam immediately after the per-beam LBT has succeeded.

2. Embodiment #2

If the total time required to perform per-beam LBT through a plurality of sensing beams is equal to or greater than T (or greater than T), Cat-2 LBT may be performed once more through a single wide beam or omni-directional beam containing all of the Tx beams immediately after the per-beam LBT has succeeded. If the Cat-2 LBT is successful, transmission may be started with a first Tx beam. For example, the single wide beam containing all Tx beams may be a beam that covers both directions and interference ranges of a plurality of the Tx beams. In other words, the single wide beam may include a beam applied to all Tx beams. For example, a single wide beam is applicable to all Tx beams to sense directions and interference ranges of all Tx beams.

3. Embodiment #1-3

When the total time required to perform per-beam LBT through a plurality of sensing beams is equal to or greater than T (or greater than T), transmission through a first Tx beam may be started if Cat-2 LBT through a sensing beam corresponding to the first Tx beam is successful immediately after the per-beam LBT has succeeded. In addition, each time the Tx beam is switched, if Cat-2 LBT is successful using a sensing beam corresponding to the Tx beam before the transmission of the corresponding Tx beam, transmission of the corresponding Tx beam may be performed.

4. Embodiment #1-4

When an LBT completion timing point of a sensing beam performing per-beam LBT last among sensing beams performing the per-beam LBT is T1, at least one of the above-described embodiments #1-1 to #1-3 may be applied based on the comparison with a maximum value of T among time differences between the completion timing points of the per-sensing beam LBTs previously performed.

Here, the T value may be configured/indicated in advance from a BS. In addition, each sensing beam may be the same (in shape and size) as a specific Tx beam or a beam including a Tx beam (shape and size thereof), and may include a wide beam compared to the Tx beam. Here, the fact that having the same shape and size of the Tx beam or including the shape and size of the Tx beam may mean having the same beam direction and interference range of the Tx beam or including the beam direction and interference range of the Tx beam. For example, a sensing beam is applied to a specific beam, and is intended to sense a space corresponding to a direction and interference range (i.e., the shape and size of a Tx beam) of each Tx beam, and a sensing range may be at least the same or larger than the direction and interference range (or the shape and size of the Tx beam) of the corresponding Tx beam. Furthermore, in the above-mentioned case, in order to sense a plurality of Tx beams, the corresponding sensing may be performed using a plurality of sensing beams of which number is equal to or greater than that of a plurality of the Tx beams. For example, a plurality of the sensing beams and a plurality of the Tx beams may correspond one-to-one or many-to-one like a plurality of the sensing beams sense one Tx beam.

In addition, sensing beams corresponding to each Tx beam may be configured/indicated for a UE in advance.

Hereinafter, the embodiments #1-1 to #1-4 will be described in detail.

When transmission is performed only in a specific beam direction, directional LBT (D-LBT) may be performed through a specific sensing beam instead of omnidirectional LBT and COT in the corresponding beam direction may be acquired.

Yet, if a plurality of Tx beams are transmitted by being TDMed within the acquired COT, LBT covering the interference ranges of all Tx beams to be transmitted by being TDMed may be necessary for COT acquisition. In doing so, LBT may be performed through a single wide beam covering the directions and interference ranges of all Tx beams to be multiplexed within the COT, or the COT may be acquired by sequentially performing per-beam LBT through individual sensing beams covering the interference ranges of the Tx beams, respectively. In this case, the sensing beams covering the interference ranges of the respective Tx beams may also be TDMed.

In this case, the per-beam LBT through a plurality of the sensing beams may be performed in correspondence with the order of the Tx beams to be transmitted in the COT. For example, Cat-3 LBT or Cat-4 LBT based on Random Back-off may be performed with a sensing beam corresponding to a Tx beam to be first transmitted, and then Cat-3 or Cat-4 LBT may be performed with a sensing beam corresponding to a next Tx beam. In this case, after the per-beam LBT has been completed, COT may be acquired. In this case, COT may be acquired only when per-beam LBT for all Tx beams is successful, or COT for only Tx beams that have succeeded in LBT may be acquired based on per-beam LBT.

If COT is acquired for only Tx beams that have succeeded in LBT, a first Tx beam among the Tx beams that have succeeded in the LBT may be the first Tx beam that performs transmission immediately after LBT success or additional Cat-2 LBT according to the total time T in the embodiment described below, and the order of Tx beams transmitted may be determined based on only the Tx beams that have succeeded in the LBT.

For example, LBT was performed for each of total eight Tx beams (e.g., Tx beam #0 to Tx beam #7), and if only LBT for the Tx beams #2, #3, #5, and #7 is successful, a first Tx beam in the embodiment described later may be the Tx beam #2. If LBT for all of the Tx beams is successful, the first Tx beam may be the Tx beam #0.

On the other hand, when the first Tx beam is actually transmitted, the LBT performance result may no longer be valid at the time when the Tx beam is transmitted, if a considerable amount of time has elapsed since the timing point of performing the LBT with the corresponding sensing beam.

Therefore, depending on the total time T required to perform per-beam LBT, transmission of the first Tx beam may be performed immediately after the LBT success or additional Cat-2 LBT may be performed before transmission through each Tx beam.

If the total time required to perform per-beam LBT through a plurality of sensing beams is equal to or smaller than T (or smaller than T), transmission may be started sequentially with a first Tx beam immediately after the per-beam LBT has succeeded according to the embodiment #1-1. Yet, if the total time required to perform per-beam LBT through a plurality of sensing beams is equal to or greater than T (or greater than T), Cat-2 LBT may be performed once more through a single wide beam or omni-directional beam containing all of the Tx beams immediately after the per-beam LBT has succeeded, and transmission may be started only if the Cat-2 LBT is successful.

Alternatively, if the total time required to perform per-beam LBT through a plurality of sensing beams is equal to or greater than T (or greater than T), Cat-2 LBT is performed through a sensing beam corresponding to a first Tx beam immediately after the per-beam LBT has succeeded in accordance with the embodiment #1-3. If the Cat-2 LBT is successful, transmission of the first Tx beam may be started. Each time the Tx beam is switched, before each Tx beam is transmitted, Cat-2 LBT through a sensing beam corresponding to the corresponding Tx beam is performed. Only if each Cat-2 LBT is successful, transmission may be performed in the direction of the corresponding Tx beam.

Here, the T value that determines whether additional LBT performance is required in comparison to the total time required for performing the per-beam LBT may be configured/indicated in advance by the BS. In addition, each sensing beam may be the same (in shape and size) as the Tx beam corresponding to the corresponding sensing beam or include (the shape and size) of the Tx beam corresponding to the corresponding sensing beam, and may include a wide beam compared to the corresponding Tx beam.

Meanwhile, sensing beams respectively corresponding to Tx beams may be configured/indicated in advance to the UE.

By performing an additional procedure such as Cat-2 LBT is performed after the completion of the LBT based on the comparison of the total time required for per-beam LBT with a previously configured/indicated T value, the embodiments #1-1 to #1-3 described above are to determine whether to start transmission of Tx beams. On the other hand, the embodiment #1-4 may apply at least one of the embodiments #1-1 to #1-3 by comparing a maximum value among differences between timing points of completing the LBT through each sensing beam with a previously configured/indicated.

For example, there are sensing beams 1/2/3 corresponding to Tx beams A/B/C, a timing point of completing all per-beam LBT is named T1, a last LBT completion timing point of a sensing beam 1 is T1 (i.e., a sensing beam in the last order of the per-beam LBT is assumed to be a sensing beam 1), an LBT completion timing point of a sensing beam 2 is T2, and an LBT completion timing point of a sensing beam 3 is T3. In this case, a maximum value selected from (T1-T2) and (T2-T3) is compared to a T value previously configured/indicated by a BS. By performing the embodiment #1-1 if the maximum value is equal to or smaller than the T value (or smaller than the T value) or applying the embodiment #1-2 or the embodiment #1-3 if the maximum value is equal to or greater than the T value (or greater than the T value), a channel access procedure and per-beam transmission may be performed.

According to the embodiments of the above-described [Proposed Method #1], when a plurality of Tx beams are TDMed, as a beam direction in which LBT was first performed may have been long since all per-beam LBT was performed (e.g., because a valid time of expecting validity of the LBT result may be exceeded), LBT may be performed once in short, thereby increasing the validity of D-LBT and minimizing collision with transmission of another UE/BS.

[Proposed Method #2]

As a BS schedules continuous UL transmission to a single UE or a plurality of UEs, a plurality of UL Tx beams are multiplexed and transmitted within the same COT. In doing so, when a COT is acquired by configuring an ED threshold (hereinafter 'T_ref') with reference to a maximum Effective Isotropic Radiated Power (EIRP) (hereinafter 'P_max') among Tx beams to be transmitted within COT or an average EIRP (hereinafter 'P_avg') of Tx beams transmitted within COT, an ED threshold configuring method and LBT procedure according to transmission power of one or more other UL transmissions to be transmitted within the remaining COT will be described.

For example, one or more other UL transmissions to be transmitted within the remaining COT are UL transmissions rather than UL transmissions considered in calculating an ED threshold for UE's COT acquisition, but may mean UL transmissions schedule within the same COT as the UL transmission considered in calculating the ED threshold. In other words, one or more other UL transmissions to be transmitted within the remaining COT may mean UL transmissions other than UL transmissions involved in UE's determination of P_max or P_avg for calculating ED thresholds among UL transmissions scheduled within the same COT.

1. Embodiment #2-1

A maximum transmission power of a UL transmission to be transmitted within the remaining COT may be set/limited to P_max or P_avg so as not to exceed P_max or P_avg used for ED threshold calculation for first COT acquisition. For example, when one or more UL transmissions other than a UL transmission involved in UE's determination of P_max or P_avg used for ED threshold calculation for COT acquisition (i.e., a UL transmission not involved in determining P_max or P_avg used for ED threshold calculation) are scheduled within the same COT, although the maximum transmission power of the corresponding one or more UL transmissions is configured to exceed P_max or P_avg, the maximum transmission power of the corresponding one or more UL transmissions may be limited to P_max or P_avg.

2. Embodiment #2-2

Cat-2 LBT is performed based on an ED threshold T_new calculated based on P_new (>P_max or P_avg) to use a power (hereinafter 'P_new'), which is greater than P_max or P_avg used to calculate the ED threshold T_ref for the first COT acquisition, for another UL transmission to be transmitted in the remaining COT. If the Cat-2 LBT is successful, another UL transmission may be performed. In this case, T_new may be a value lower than T_ref.

3. Embodiment #2-3

A new COT is initiated by performing Cat-3 or Cat-4 LBT is performed based on an ED threshold T_new calculated based on P_new (>P_max or P_avg) to use a power (hereinafter 'P_new'), which is greater than P_max or P_avg used to calculate the ED threshold T_ref for the first COT acquisition, for another UL transmission to be transmitted in the remaining COT, and another UL transmission may be performed within the new COT. In this case, T_new may be a value lower than T_ref.

4. Embodiment #2-4

When a power (hereinafter 'P_new'), which is greater than P_max or P_avg used to calculate an ED threshold T_ref for first COT acquisition, is used for another UL transmission to be transmitted in the remaining COT, the corresponding another UL transmission may be dropped.

Hereinafter, the embodiments #2-1 to #2-4 of [Proposed Method #2] will be described in detail.

For example, suppose that a BS consecutively schedules a UL #1 transmission, a UL #2 transmission, and a UL #3 transmission within the same COT. When LBT is performed to acquire COT before the UL #1 and UL #2 transmissions, a UE knows a presence or non-presence of scheduling for UL #1 and UL #2 and transmission powers of UL #1 and UL #2 are configured. Yet, the UE may not know whether there is a scheduling for UL #3, or it may be a timing point before configuring a transmission power of UL #3 (although it was scheduled).

For example, three examples, which are some of the examples of the above-described situation, will be described with reference to FIGS. 17A to 17C. As a first example, referring to FIG. 17A, as DCI #1 and DCI #2 (or the same DCI or RRC configured) are received or decoded before a UE calculates an ED threshold, UL #1 and UL #2 respectively corresponding to DCI #1 and DCI #2 (or the same DCI or RRC configured) are scheduled in COT to be acquired after LBT and transmission powers of UL #1 and UL #2 are acquired. Yet, UL #3 is scheduled by DCI #3 that is received or decoded after COT initiation, and a transmission power of UL #3 is not reflected in ED threshold calculation and LBT performance.

Figure 17A:
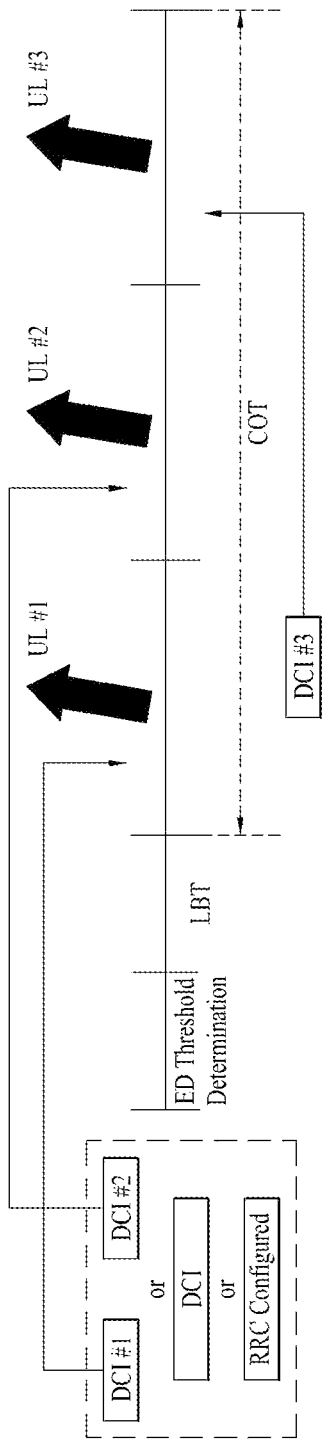
FIGS. 17A to 17C are diagrams illustrating a method of transmitting and receiving a uplink signal within one Channel Occupancy Time (COT) according to an embodiment of the present disclosure.
Figure 17B:
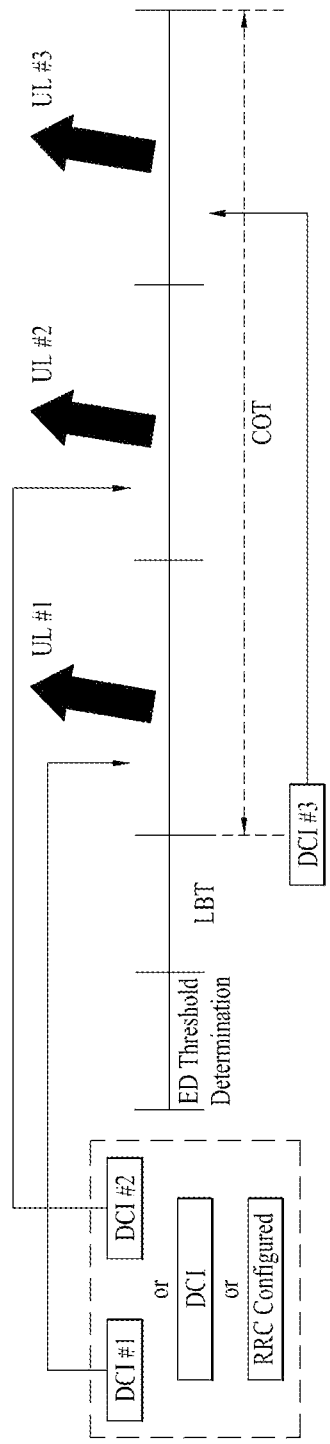

As a second example, referring to FIG. 17B, as DCI #1 and DCI #2 (or the same DCI or RRC configured) are received or decoded before a UE calculates an ED threshold, UL #1 and UL #2 respectively corresponding to DCI #1 and DCI #2 (or the same DCI or RRC configured) are scheduled in COT to be acquired after LBT and transmission powers of UL #1 and UL #2 are acquired. Yet, UL #3 is scheduled by DCI #3 that is received or decoded after LBT performance or a transmission power of UL #3 is acquired after the LBT performance, and thus the transmission power of UL #3 is not reflected in ED threshold calculation and LBT performance.

Figure 17C:
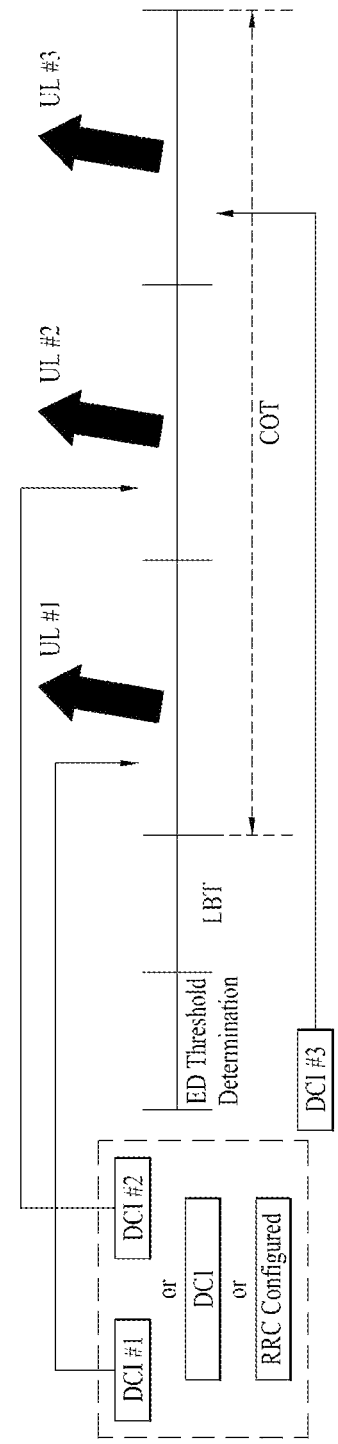

As a third example, referring to FIG. 17C, as DCI #1 and DCI #2 (or the same DCI or RRC configured) are received or decoded before a UE calculates an ED threshold, UL #1 and UL #2 respectively corresponding to DCI #1 and DCI #2 (or the same DCI or RRC configured) are scheduled in COT to be acquired after LBT and transmission powers of UL #1 and UL #2 are acquired. Yet, UL #3 is scheduled by DCI #3 that is received or decoded after the UE has started to calculate an ED threshold, or a transmission power of UL #3 is acquired after starting to calculate an ED threshold, and thus the transmission power of UL #3 is not reflected in ED threshold calculation and LBT performance.

In the above-described situation, since COT is acquired by performing LBT in a manner of configuring an ED threshold (i.e., T_ref) with reference to a maximum EIRP (i.e., P_max) or an average EIRP (i.e., P_avg) of Tx beams transmitted in COT among Tx beams to be transmitted within the COT (i.e., by evaluating IDLE/BUSY of a channel), other ULs transmitted in the remaining COT may need to be configured/limited so as not to exceed P_max or P_avg used for ED threshold calculation for first COT acquisition.

Therefore, as described in the embodiment #2-1, COT may be initiated by performing LBT in a manner of applying an ED threshold calculated with reference to a maximum EIRP P_max among UL transmissions (e.g., UL #1 and UL #2) apprehended by a UE until a timing point of performing LBT first by the UE or a timing point ahead of a specific time from the corresponding LBT timing point or an average EIRP P_avg of EIRPs of UL transmissions (e.g., UL #1 and UL #2) apprehended by the UE. Thereafter, for another UL transmission scheduled or transmission-power-acquired after initiation of the corresponding COT and/or another UL transmission scheduled or transmission-power-acquired at a timing point of performing LBT first by the UE or after a specific time behind the corresponding LBT timing point, or another UL transmission scheduled or transmission-power-acquired after a timing point of determining an ED threshold based on transmission power information acquired for LBT performance ahead of the corresponding LBT performance, an operation of restricting the transmission power of the corresponding another UL transmission from exceeding P_max or P_avg used for the first ED threshold calculation may be needed. For example, although P_new, which is the transmission power configured/indicated to UL #3 by the BS, is higher than P_max or P_avg, P_new may be limited to P_max or P_avg, P_new only for transmission.

In other words, if P_new, which is the transmission power configured/indicated to UL #3, is higher than P_max or P_avg, UL #3 may be transmitted with the transmission power of P_max or P_avg.

Here, if the transmission times of the respective Tx beams within the COT are the same, the average EIRP may be determined by dividing the sum of EIRP values of the respective Tx beams by the number of beams. For example, when the power in the COT changes in the order of A1, A2, and A3, it may be calculated as P_avg={A1+A2+A3}/3. Here, A1, A2, and A3 may correspond to Tx beam #1, Tx beam #2, and Tx beam #3, respectively, and it is assumed that time regions occupied by Tx beam #1, Tx beam #2, and Tx beam #3 within the COT are the same.

On the other hand, in the above-described example, if the UL #3 is intended to be transmitted with a power greater than P_max or P_avg of UL #1 and UL #2 used to calculate the ED threshold for the first COT acquisition, the method of the embodiment #2-2, the embodiment #2-3 or the embodiment #2-4 may apply.

For example, if LBT was performed using T_ref, which is based on P_max or P_avg, as an ED threshold to acquire COT first, it is necessary to determine whether the channel is BUSY/IDLE more sensitively using T_new, which is an ED threshold relatively lower than T_ref, to transmit UL #3 with P_new that is a transmission power greater than P_max or P_avg.

Here, T_new is an ED threshold calculated based on P_new.

In addition, like the embodiment #2-2, Cat-2 LBT is performed by setting an ED threshold to T_new (<T_ref) before UL #3 transmission. If it is successful, UL #3 may be transmitted within the first acquired COT.

Alternatively, like the embodiment #2-3, a new COT may be acquired by performing a new LBT (e.g., Cat-3 LBT or Cat-4 LBT) through T_ref (<T_ref) calculated based on P_new for UL #3 with a larger transmission power of P_new aside from COT acquired according to T_ref based on UL #1 and UL #2 transmission powers. In addition, in this case, UL #3 may be transmitted within the newly acquired COT.

Alternatively, like the embodiment #2-4, if P_new, which is the transmission power of UL #3, is greater than P_max or P_avg of UL #1 and UL #2 already transmitted after the LBT procedure in COT, a method of not transmitting UL #3 (i.e., UL #3 drop) may be applicable.

According to the above-described embodiments of [Proposed Method #2], after performing an operation for COT acquisition, if a UE performs LBT in consideration of EIRPs of UL signals considered to be transmitted within the COT by the corresponding UE at the time of LBT performance, even if another UL signal scheduled within the corresponding COT is recognized, an EIRP of the corresponding another UL signal is restricted, whereby interference to another BS/UE may be reduced and fair co-existence between heterogeneous RATs may be achieved.

[Proposed Method #3]

A UL COT start timing of a UE is T, and LBT may be performed using an ED threshold calculated from a PUSCH scheduled by a UL grant (e.g., a UL grant for a PUSCH to be included in the same UL COT) and RRC configured UL signals and channels included in the same UL COT (e.g., a CG-PUSCH, a semi-static PUCCH/SRS, and/or a semi-persistent PUSCH/PUCCH).

In this case, the value of K may include {N2+α} or {(the minimum value of K2 values configured for the UE)+α}. Here, the a value may be set differently for each UE depending on the capability of the UE, or a specific value (e.g., α=0 symbol, 1 symbol, 0 slot, or 1 slot) may be defined in advance. Alternatively, a plurality of values may be defined in advance for α, and one of a plurality of the values may be set by UE capability and BS signaling.

When the UE receives a plurality of UL transmission schedulings to be transmitted in the UL COT from the BS, the UL power for each UL transmission may be configured before the COT starts. In addition, an ED threshold may be set based on the configured UL power, and the LBT may be performed based on the configured ED threshold.

Therefore, it is possible to configure the UL transmission power only when an N2 time, which is the existing minimum processing time, is guaranteed basically. In addition, since it is necessary to perform LBT, which calculates an ED threshold based on the corresponding UL transmission power and determines whether a channel is IDLE/BUSY based on the calculated ED threshold, an additional margin may be guaranteed with a minimum processing time.

In other words, when the UE starts the LBT from a specific timing point, it may be considered as a timeline to calculate the ED threshold in consideration of the UL power of UL signals/channels that may be apprehended at the corresponding timing point.

Therefore, if the UL COT start timing point of the UE is T, LBT may be performed with an ED threshold calculated from a PUSCH scheduled by a UL grant (a UL grant for a PUSCH to be included in the same UL COT) received before a timing point (T-K) and RRC configured UL signals and channels (e.g., CG-PUSCH, semi-static PUCCH/SRS, and/or semi-persistent PUSCH/PUCCH) included in the same UL COT. In this case, the value of K may include {N2+α} or {(the minimum value of K2 values configured for the UE)+α}. Here, the a value may be a different value for each UE according to the capability of the UE. Alternatively, a specific value (e.g., α=0 symbol, 1 symbol, 0 slot, or 1 slot) may be defined in advance. Alternatively, a plurality of values may be defined in advance for α, and one of a plurality of the values may be configured by UE capability and BS signaling.

For example, in the above description related to FIGS. 17A to 17C, since DCI #3 is received or decoded at least after the timing point (T-K), the UE may not consider UL #3 scheduled by the DCI #3 in calculating the ED threshold.

In addition, for example, in FIGS. 17A to 17C described above, UL #1 and UL #2 may be scheduled by DCI or include RRC-configured UL signals, and the DCI and/or RRC configuration that schedules the UL #1 and/or UL #2 may be received or decoded before the timing point (T-K) and then reflected in calculating the ED threshold by the UE.

On the other hand, two operations of UL power setting and {EDT calculation+LBT performance} may proceed in parallel or sequentially depending on UE implementation. For example, the result of decrementing a back-off counter based on an ED threshold A and the result of decrementing the back-off counter based on an ED threshold B may be different. In addition, if the UE stores only the back-off counter value in the buffer at every moment, the two operations can proceed sequentially. In this case, since the ED threshold determination should be completed at the LBT start timing point, the margin value a may have to be larger.

As another example, if an energy value of measuring a channel at every moment is stored by the UE implementation, even if the ED threshold is changed later, the back-off counter value may be backward calculated based on the changed value, so in this case, the margin a value may be relatively small.

According to the above-described [Proposed Method #3], it is possible to clarify the criterion of a UL signal considered by a UE to determine an ED threshold value. Accordingly, the UE may clearly distinguish between the UL signal for determining the ED threshold and another UL signal for performing transmission according to [Proposed Method #2].

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

Figure 18:
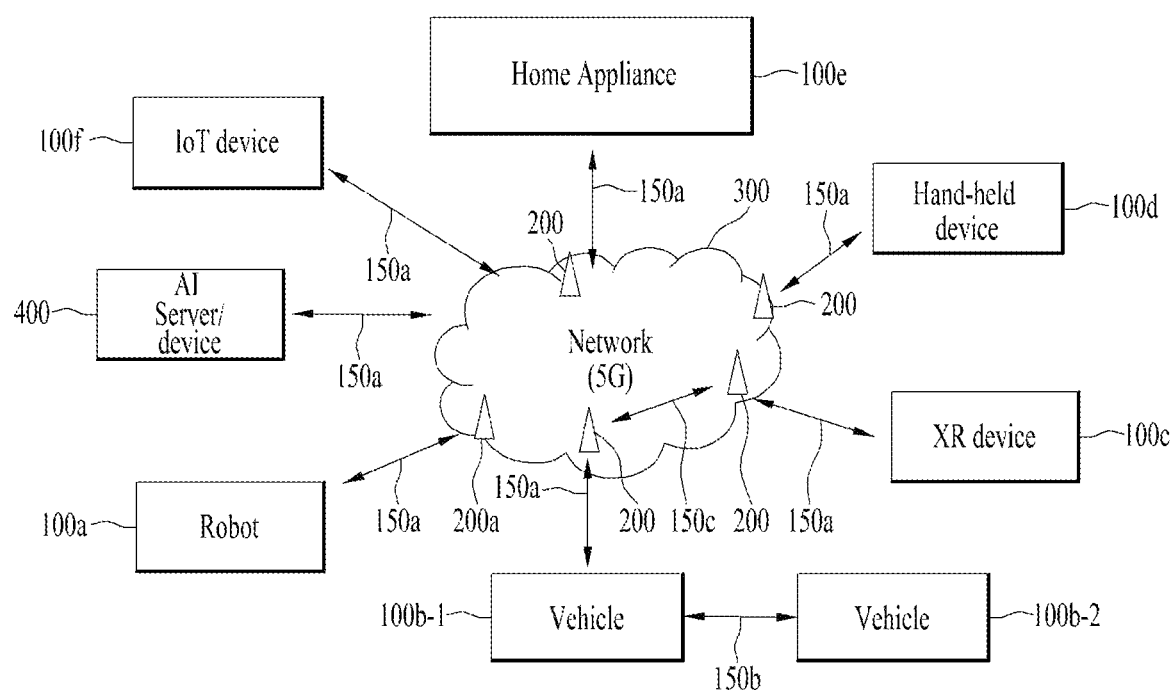
FIG. 18 illustrates an exemplary communication system applied to the present disclosure.

FIG. 18 illustrates a communication system 1 applied to the present disclosure.

Referring to FIG. 18, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smartpad, a wearable device (e.g., a smartwatch or smartglasses), and a computer (e.g., a laptop). The home appliance may include a TV, a refrigerator, a washing machine, and so on. The IoT device may include a sensor, a smartmeter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

Figure 19:
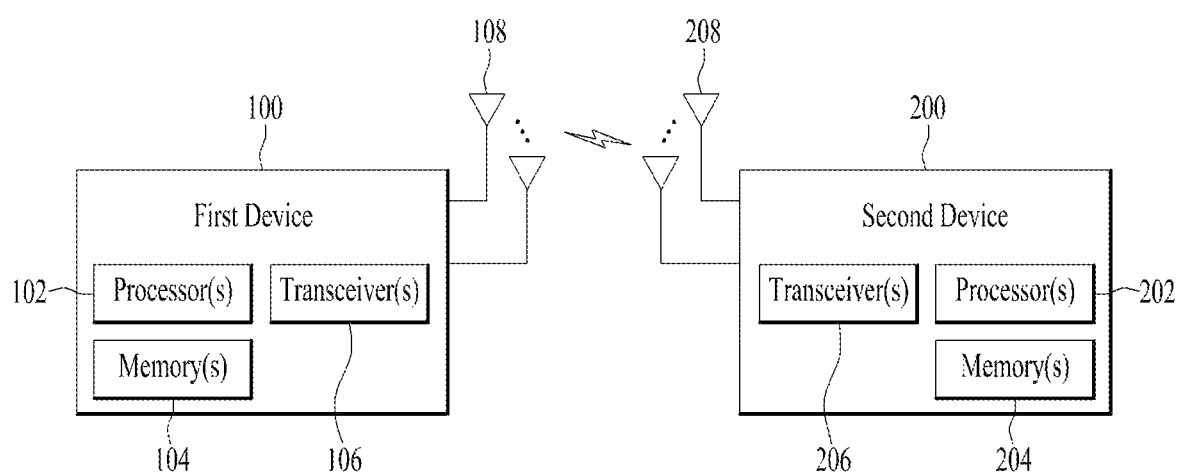
FIG. 19 illustrates an exemplary wireless device applicable to the present disclosure.
Figure 20:
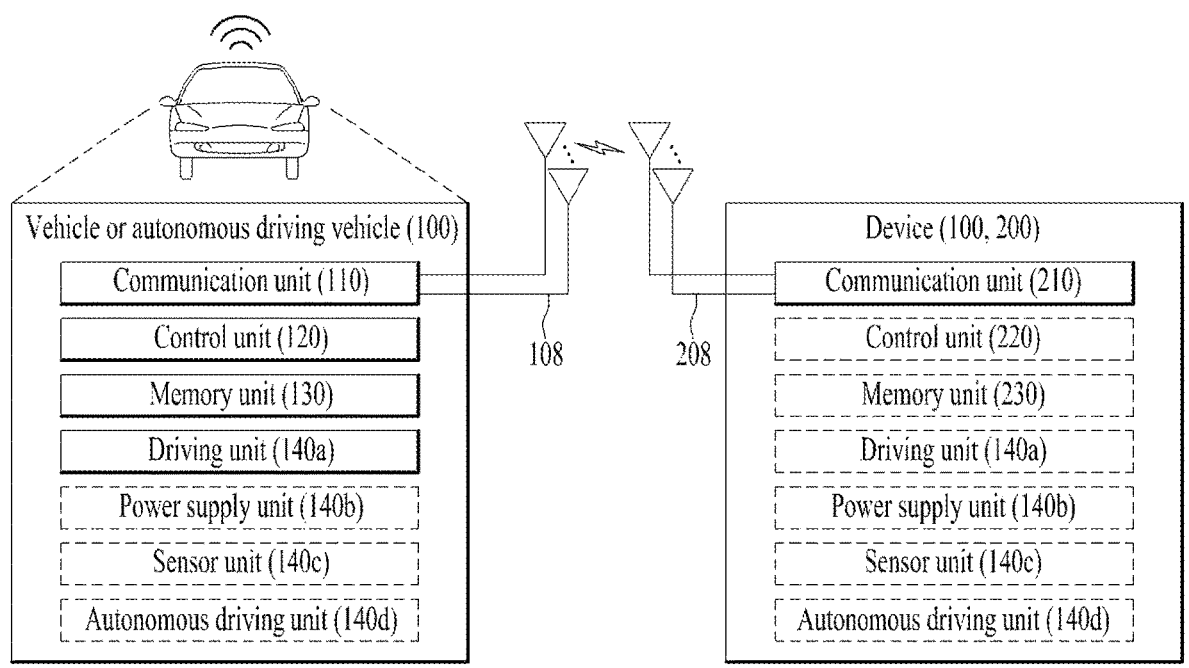
FIG. 20 illustrates an exemplary vehicle or autonomous driving vehicle applicable to the present disclosure.

FIG. 19 illustrates wireless devices applicable to the present disclosure.

Referring to FIG. 19, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 18.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

Specifically, instructions and/or operations, controlled by the processor 102 of the first wireless device 100 and stored in the memory 104 of the first wireless device 100, according to an embodiment of the present disclosure will be described.

Although the following operations will be described based on a control operation of the processor 102 in terms of the processor 102, software code for performing such an operation may be stored in the memory 104. For example, in the present disclosure, the at least one memory 104 may be a computer-readable storage medium and may store instructions or programs. The instructions or programs may cause, when executed, the at least one processor operably connected to the at least one memory to perform operations according to embodiments or implementations of the present disclosure, related to the following operations.

For example, the processor 102 may determine an Energy Detection (ED) threshold based on at least one first UL signal. For example, the processor 102 may determine the at least one first UL signal referred to determine the ED threshold and the ED threshold based on the at least one first UL signal based on [Proposed Method #2] and/or [Proposed Method #3].

The processor 102 may perform a Listen-Before-Talk (LBT) based on the ED threshold. In doing so, the LBT may be performed based on a D-LBT. For example, the corresponding LBT may be performed based on [Proposed Method #1]. Yet, it is non-limited by [Proposed Method #1], and any method capable of multiplexing a plurality of Tx beams and transmitting a UL signal through the corresponding Tx beams may be used for LBT performance.

The processor 102 may control the transceiver 106 to transmit the at least one first UL signal and/or a second UL signal within a Channel Occupancy Time (COT) acquired through the LBT. For example, the at least one first UL signal and/or the second UL signal may be determined and transmitted based on [Proposed Method #2] and/or [Proposed Method #3].

As another example, the processor 102 may control the transceiver 106 to receive information for scheduling a DL signal. In addition, the processor 102 may control the transceiver 106 to receive the DL signal based on the corresponding information. In doing so, the DL signal may be received based on [Proposed Method #1].

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Specifically, instructions and/or operations, controlled by the processor 202 of the second wireless device 100 and stored in the memory 204 of the second wireless device 200, according to an embodiment of the present disclosure will be described.

Although the following operations will be described based on a control operation of the processor 202 in terms of the processor 202, software code for performing such an operation may be stored in the memory 204. For example, in the present disclosure, the at least one memory 204 may be a computer-readable storage medium and may store instructions or programs. The instructions or programs may cause, when executed, the at least one processor operably connected to the at least one memory to perform operations according to embodiments or implementations of the present disclosure, related to the following operations.

For example, the processor 202 may control the transceiver 206 to transmit a first information for scheduling at least one first UL signal.

The processor 202 may control the transceiver 206 to transmit a second information for scheduling a second UL signal.

For example, the transmission timing point of the first information for scheduling the at least one first UL signal and/or the second information for scheduling the second UL signal may be determined based on [Proposed Method #2] and/or [Proposed Method #3].

The processor 202 may control the transceiver 206 to receive the at least one first UL signal and/or the second UL signal. For example, the processor 202 may control the transceiver 206 to receive the at least one first UL signal and/or the second UL signal based on [Proposed Method #2] and/or [Proposed Method #3].

As another example, the processor 202 may control the transceiver 206 to perform an LBT and transmit an information for scheduling a DL signal. For example, the processor 202 may perform the LBT based on [Proposed Method #1].

The processor 202 may perform an LBT for DL signal transmission. For example, the processor 202 may perform the LBT based on [Proposed Method #1]. Yet, if the DL signal is transmitted within a COT acquired by the LBT performed in the previous step, the corresponding step may be omitted or a non-random back-off based LBT (e.g., Cat-1 LBT or Cat-2 LBT) may be performed. The processor 202 may control the transceiver 206 to transmit the DL signal based on the corresponding information (S1507).

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

FIG. 28 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 28, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles.

During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using A1 technology based on the information collected from vehicles or autonomous driving vehicles and provide the predicted traffic information data to the vehicles or the autonomous driving vehicles.

The embodiments of the present disclosure described herein below are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present disclosure or included as a new claim by a subsequent amendment after the application is filed.

In the present disclosure, a specific operation described as performed by the BS may be performed by an upper node of the BS in some cases. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

While the above-described method of transmitting and receiving a signal in an unlicensed band and an apparatus therefor have been described based on an example applied to a 5G NR system, the method and apparatus are applicable to various wireless communication systems in addition to the 5G NR system.

What is claimed is:

1. A method of transmitting an UpLink (UL) signal by a User Equipment (UE) in a wireless communication system, the method comprising:
   determining an Energy Detection (ED) threshold based on a maximum Effective Isotropic Related Power (EIRP) among at least one first EIRP for at least one first UL signal;
   acquiring a channel occupancy based on the ED threshold; and
   transmitting, within the channel occupancy, (i) the at least one first UL signal based on each of the at least one first EIRP for each of the at least one first UL signal and (ii) a second UL signal based on a second EIRP,
   wherein the second UL signal is initiated during the channel occupancy and the second EIRP is limited to the maximum EIRP.

2. The method of claim 1, wherein the second UL signal is not considered in determination of the ED threshold.

3. The method of claim 1, wherein scheduling information for the at least one first UL signal is received before scheduling information for the second UL signal is received.

4. The method of claim 1, wherein the second EIRP is set equal to the maximum EIRP by the UE based on an EIRP indicated by a base station (BS) for the second UL signal being greater than the maximum EIRP.

5. The method of claim 1, wherein the channel occupancy is acquired based on a success of Listen-Before-Talk (LBT) based on the ED threshold.

6. The method of claim 1, wherein the at least one first UL signal and the second UL signal are transmitted through UL Tx beams different from each other.

7. The method of claim 1, wherein the at least one first UL signal and the second UL signal are transmitted through frequency band of above 52.6 GHz.

8. A user equipment configured to transmit an UpLink (UL) signal in a wireless communication system, the user equipment comprising:
   at least one transceiver;
   at least one processor; and
   at least one memory connected operably to the at least one processor and configured to store instructions for enabling the at least one processor to perform an operation when executed,
   wherein the operation comprises determining an Energy Detection (ED) threshold based on a maximum Effective Isotropic Related Power (EIRP) among at least one first EIRP for at least one first UL signal, acquiring a channel occupancy based on the ED threshold, and transmitting, within the channel occupancy, (i) the at least one first UL signal based on each of the at least one first EIRP for each of the at least one first UL signal and (ii) a second UL signal based on a second EIRP and
   wherein the second UL signal is initiated during the channel occupancy and the second EIRP is limited to the maximum EIRP.

9. The user equipment of claim 8, wherein the second UL signal is not considered in determination of the ED threshold.

10. The user equipment of claim 8, wherein scheduling information for the at least one first UL signal is received before scheduling information for the second UL signal is received.

11. The user equipment of claim 8, wherein the second EIRP is set equal to the maximum EIRP by the user equipment based on an EIRP indicated by a base station (BS) for the second UL signal being greater than the maximum EIRP.

12. The user equipment of claim 8, wherein the channel occupancy is acquired based on a success of Listen-Before-Talk (LBT) based on the ED threshold.

13. The user equipment of claim 8, wherein the at least one first UL signal and the second UL signal are transmitted through UL Tx beams different from each other.

14. The user equipment of claim 8, wherein the at least one first UL signal and the second UL signal are transmitted through frequency band of above 52.6 GHz.

15. At least one memory connected operably to at least one processor and configured to store instructions for enabling the at least one processor to perform an operation when executed,
- wherein the operation comprises determining an Energy Detection (ED) threshold based on a maximum Effective Isotropic Related Power (EIRP) among at least one first EIRP for at least one first UpLink (UL) signal, acquiring a channel occupancy based on the ED threshold, and transmitting, within the channel occupancy, (i) the at least one first UL signal based on each of the at least one first EIRP for each of the at least one first UL signal and (ii) a second UL signal based on a second EIRP and
- wherein the second UL signal is initiated during the channel occupancy and the second EIRP is limited to the maximum EIRP.

* * * * *